(12) United States Patent
Dikbas et al.

(10) Patent No.: US 8,588,536 B2
(45) Date of Patent: Nov. 19, 2013

(54) GUARANTEED-RATE TILED IMAGE DATA COMPRESSION

(75) Inventors: Salih Dikbas, Allen, TX (US); Mehmet Umut Demircin, Kecloren (TR); Minhua Zhou, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 238 days.

(21) Appl. No.: 13/024,989

(22) Filed: Feb. 10, 2011

(65) Prior Publication Data

US 2011/0206289 A1   Aug. 25, 2011

Related U.S. Application Data

(60) Provisional application No. 61/306,620, filed on Feb. 22, 2010.

(51) Int. Cl.
*G06K 9/36* (2006.01)

(52) U.S. Cl.
USPC .......................................................... 382/232

(58) Field of Classification Search
USPC ................................................ 382/232–253
See application file for complete search history.

(56) References Cited

U.S. PATENT DOCUMENTS

| | | | | |
|---|---|---|---|---|
| 2002/0080408 | A1* | 6/2002 | Budge et al. ............... | 358/261.2 |
| 2004/0213349 | A1* | 10/2004 | Zador et al. .............. | 375/240.22 |
| 2006/0239565 | A1* | 10/2006 | Park et al. ..................... | 382/232 |
| 2010/0002946 | A1 | 1/2010 | Dikbas et al. | |

OTHER PUBLICATIONS

M.J. Weinberger, et al., "LOCO-I: A Low Complexity, Context-Based, Lossless Image Compression Algorithm", Proc. Data Compression Conference, Snowbird, UT, Mar. 1996, pp. 140-149.
X. Wu and N. Memon, "Context-Based, Adaptive, Lossless Image Coding", IEEE Transactions on Communications, vol. 45, No. 4, Apr. 1997, pp. 437-444.
S.W. Golumb, "Run-Length Encodings", IEEE Transactions on Information Theory, vol. 12, Jul. 1966, pp. 399-401.
J. Teuhola, "A Compression Method for Clustered Bit-Vectors", Information Processing Letters, vol. 7, No. 6, Oct. 1978, pp. 308-311.
J. Shapiro, "Embedded Image Coding Using Zerotree of Wavelet Coefficients," IEEE Transactions on Signal Processing, vol. 41, No. 12, Dec. 1993, pp. 3445-3462.
A. Said and W. Pearlman, "A New, Fast, and Ffficient Image Codec Based on Set Partitioning in Hierarchical Tress", IEEE Transactions on Circuits and Systems for Video Technology, vol. 6, No. 3, Jun. 1996, pp. 243-250.

(Continued)

*Primary Examiner* — Alex Liew
(74) *Attorney, Agent, or Firm* — Mirna Abyad; W. James Brady; Frederick J. Telecky, Jr.

(57) ABSTRACT

A method of compressing digital image data is provided that includes, for each image data block in a plurality of image data blocks in the digital image data, transforming image data in the image data block to convert the image data to a low-frequency coefficient and a plurality of high-frequency coefficients, computing a predicted low-frequency coefficient for the image data block based on at least one neighboring image data block in the plurality of image data blocks, computing a residual low-frequency coefficient based on the predicted low-frequency coefficient and the low-frequency coefficient, quantizing the plurality of high-frequency coefficients, and entropy coding the residual low-frequency coefficient and the quantized high-frequency coefficients.

6 Claims, 8 Drawing Sheets

(56) References Cited

OTHER PUBLICATIONS

D. Taubman, "High Performance Scalable Image Compression with EBCOT", IEEE Transactions on Image Processing, vol. 9, No. 7, Jul. 2000, pp. 1158-1170.

W. Sweldens, "The Lifting Scheme: A New Philosphy of Biorthogonal Wavelets Constructions", Wavelet Applications in Signal and Image Processing III, A. F. Laine and M. Unser, Eds., Proc. SPIE, vol. 2569, 1995, pp. 68-79.

R. Calderbank, et al., "Wavelet Transforms That Map Integers to Integers", Applied and Computational Harmonic Analysis, vol. 5, pp. 332-369, Jul. 1998.

A. Said and W. Pearlman, "An Image Multiresolution Representation for Lossless and Lossy Compression", IEEE Transactions on Image Processing, vol. 5, No. 9, Sep. 1996, pp. 1303-1310.

K. Sayood, "Introduction to Data Compression, Third Edition", Morgan Kaufmann Publishers, 2005, pp. 65-67, 227-244.

J. Liang, "ENSC 424—Multimedia Communications Engineering, Topic 7: Quantization 1", Simon Fraser University, Sep. 27, 2005, pp. 1-23, available at http://www.ensc.sfu.ca/~jiel/courses/424/slides/07_Quantization_1.pdf.

A. Ortega and K. Ramchandran, "Rate-Distortion Methods for Image and Video Compression", IEEE Signal Processing Magazine, Nov. 1998, pp. 23-50.

S.D. Rane and G. Sapiro, "Evaluation of JPEG-LS, the New Lossless and Controlled-Lossy Still Image Compression Standard, for Compression of High-Resolution Elevation Data", IEEE Transactions on Geoscience and Remote Sensing, vol. 39, No. 10, Oct. 2001, pp. 2298-2306.

M. Budagavi and M. Zhou, "Video Coding Using Compressed Reference Frames", IEEE International Conference on Acoustics, Speech and Signal Processing, Las Vegas, NV, Mar. 31-Apr. 4, 2008, pp. 1156-1168.

Madhukar Budagavi, et al., "Video Coding Technology Proposal by Texas Instruments Inc. (JCTVC-A101.doc)", Presentation for JCTVC-A101, Joint Collaborative Team on Video Coding (JCT-VC) of ITU-T SG16 WP3 and ISO/IEC JTC1/SC29/WG11, Dresden, Germany, Apr. 15-23, 2010, pp. 1-22.

Y. Chen, et al, "Line-Based Compression for Digital Image Data", U.S. Appl. No. 12/572,408, filed Oct. 2, 2009, pp. 1-61.

\* cited by examiner

ND STATES PATENT

GUARANTEED-RATE TILED IMAGE DATA COMPRESSION

CROSS-REFERENCE TO RELATED APPLICATIONS

This application claims benefit of U.S. Provisional Patent Application Ser. No. 61/306,620, filed Feb. 22, 2010, which is incorporated by reference herein in its entirety. This application is also related to United States Patent Application Publication No. 20100002976, filed Jul. 2, 2009, which is incorporated by reference herein in its entirety.

BACKGROUND OF THE INVENTION

The demand for digital video products continues to increase. Some examples of applications for digital video include video communication, security and surveillance, industrial automation, and entertainment (e.g., DV, HDTV, satellite TV, set-top boxes, Internet video streaming, digital cameras, cellular telephones, video jukeboxes, high-end displays and personal video recorders). Further, video applications are becoming increasingly mobile as a result of higher computation power in handsets, advances in battery technology, and high-speed wireless connectivity.

Video compression is an essential enabler for digital video products. Compression-decompression (CODEC) algorithms enable storage and transmission of digital video. Codecs may be, for example, industry standards such as MPEG-2, MPEG-4, H.264/AVC, etc. and the standard currently under development, HEVC. At the core of all of these standards is the hybrid video coding technique of block motion compensation (prediction) plus transform coding of prediction error. Block motion compensation is used to remove temporal redundancy between successive pictures (frames or fields) by prediction from prior pictures, whereas transform coding is used to remove spatial redundancy within each block.

In many digital video products (e.g., a digital still camera, a digital video camera, a cellular telephone, etc.), raw video data is captured by a sensor and fed into a preview engine for processing. After processing, the resulting video sequence is stored in an external (i.e., off-chip) memory. A video encoder then fetches the video sequence from the external memory to encode it. In addition, during encoding, the video encoder both encodes a picture and stores a decoded copy of the picture in the external memory for use in prediction of a subsequent picture. The video encoder then fetches the decoded copy from the external memory when needed to perform prediction. Thus, the video encoder is fetching both pictures to be encoded and prior pictures from external memory to perform the encoding, and storing prior pictures in the external memory.

In a similar fashion, a video decoder both decodes an encoded picture and stores a decoded copy of the picture in external memory for use in decoding of a subsequent encoded picture. The video decoder then fetches the decoded copy from the external memory to perform the decoding. Thus, the video decoder is fetching both pictures to be decoded and prior decoded pictures from external memory to perform the decoding, and storing prior decoded pictures in external memory.

The real-time video data transfer to external memory and to and from external memory to the video encoder or video decoder requires a lot of memory bandwidth, especially if the video resolution is D1 (720×480) or higher. However, memory bandwidth is limited in many digital video products due to both cost and power constraints. Accordingly, reducing memory bandwidth requirements for processing video data is desirable.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
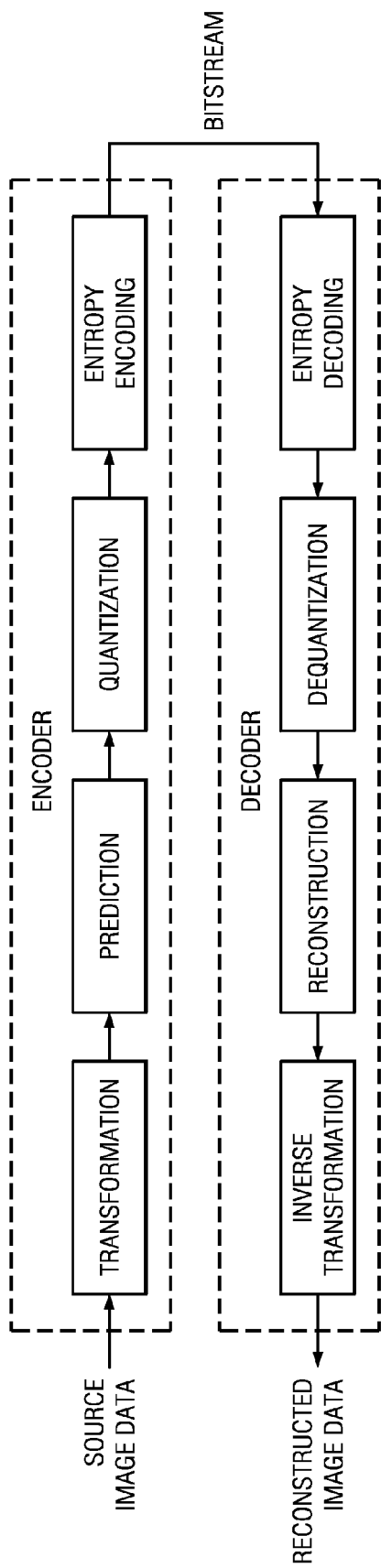
FIG. 1 shows a block diagram of an image data compression system in accordance with one or more embodiments of the invention.

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein. Further, embodiments of the invention should not be considered limited to any particular video coding standard. In addition, for convenience in describing embodiments of the invention, the term frame may be used to refer to the portion of a video sequence being encoded or decoded. One of ordinary skill in the art will understand embodiments of the invention that operate on subsets of frames such as, for example, a slice, a field, a video object plane, etc.

As used herein, the term digital image data refers to pixels in a single digital image or a digital video sequence. The term may also refer to luminance data and/or chrominance data of pixels. For example, an image data block may be composed of pixels having both luminance data and chrominance data, pixels having only luminance data, or pixels having only chrominance data. The pixels may be all or a subset of a single digital image or may be all or a subset of a frame/picture in a digital video sequence, and may have one or multiple color components. Accordingly, although various embodiments of the invention are described herein in reference to processing of digital video sequences, embodiments for processing of digital still images will be understood by one of ordinary skill in the art.

Many current image, video, and graphics applications heavily utilize image data stored in external memory, which can be in different formats, e.g., raster, tile (or block). Oftentimes, compression of this off-chip data is essential to reduce the memory bandwidth and storage requirements, reduce the power consumption, and lower the chip cost. Either lossy or lossless compression may be used, depending on the application requirements. Embodiments of the invention provided for the compression and decompression of tiled image data that may provide minimal subjective degradation of the image data, acceptable objective quality of the image data, random access to the compressed image data, and low-complexity hardware implementation.

Existing video coding techniques defined by the video compression standards are not directly applicable to memory-data compression (MC) as the objectives are different. In general, an MC technique should be simple and, if possible, offer a constant compression ratio, whereas the video coding techniques provided in the standards are very complex and offer much higher compression ratios. In addition, an MC technique generally processes one frame at a time and thus cannot exploit the inter-frame correlation used in these video coding techniques.

MC may be lossy or lossless. In the lossless case, there is no loss in the compression/decompression process, i.e., the process is distortion-free; whereas, in the lossy case, distortion is introduced through a quantization process. In general, to guarantee a desired compression ratio and random access while resulting in minimal degradation, lossy compression may be used and rate-distortion optimization may be employed.

FIG. 1 shows a block diagram of an image data compression system. If the system is used as shown, the system performs lossy compression. If the quantization and de-quantization is omitted, the system performs lossless compression. The system includes two main components: an encoder and a decoder. The encoder performs compression and is generally composed of four components: 1) transformation, 2) prediction, 3) quantization, and 4) entropy encoding. The output of the encoder is the encoded bit-stream, which is a compressed representation of the input data. This bit-stream is either stored or transmitted depending on the application. The decoder performs the decompression by doing the inverse of the steps in the encoder in reverse order as shown in FIG. 1, namely: 1) entropy decoding, 2) de-quantization, 3) reconstruction and, 4) inverse transformation. The transformation component de-correlates the image data by exploiting the spatial/temporal redundancy of the image data. The prediction component predicts a block of pixels using its spatial/temporal neighbors and computes the residual. The quantization component quantizes at least some of the image data to decrease the encoded bit-stream length at the cost of distortion. The entropy encoding component performs entropy coding to minimize the average code-word length.

In general, embodiments of the invention provide for compression and decompression of digital image data to reduce memory bandwidth requirements for image/video encoding and decoding. More specifically, in one or more embodiments of the invention, to compress a frame of image data, the frame is divided into blocks of pixels, i.e., tiles. The blocks are compressed in raster scan order as follows. Initially, the pixel data in a block is separated into luminance data and chrominance data. The luminance and chrominance data are then compressed separately, but in the same way. That is, a transformation, e.g., an integer wavelet transformation, is first performed on the luminance data and on the chrominance data. The transformed luminance data and the transformed chrominance data are each then split into low-frequency and high-frequency components.

Spatial prediction is performed on each of the low-frequency components to determine prediction residuals for each of the low-frequency components. A quantization parameter and entropy encoding parameters are also selected based on a rate control technique that guarantees the maximum compression rate. The quantization parameter is used to quantize the high-frequency components of the luminance data and of the chrominance data. The entropy encoding parameter is used to entropy code the low-frequency prediction residual of the luminance data and of the chrominance data and the quantized high-frequency components of the luminance and chrominance data. The entropy coded chrominance data and the entropy coded luminance data are then concatenated and output as a compressed block. The quantization parameter and the entropy encoding parameter are also coded and output as a header for the compressed block. In one or more embodiments of the invention, to decompress a compressed block of pixels, the compression process is essentially reversed.

In some embodiments of the invention, raw digital image data is pre-processed and compressed as described herein and stored in an external memory. The compressed data is then decompressed when fetched from memory by an encoder to be encoded. Further, in some embodiments of the invention, reference frame data generated by an encoder during encoding of digital image data is compressed prior to storage in an external memory as described herein. The compressed reference data is then decompressed to reverse the compression as described herein when fetched from the external memory by the encoder for use in encoding. In some embodiments of the invention, reference frame data generated by a decoder during decoding of digital image data is compressed prior to storage in an external memory as described herein. The compressed reference frame data is then decompressed to reverse the compression as described herein when fetched from the external memory by the decoder for use in decoding.

Figure 2:
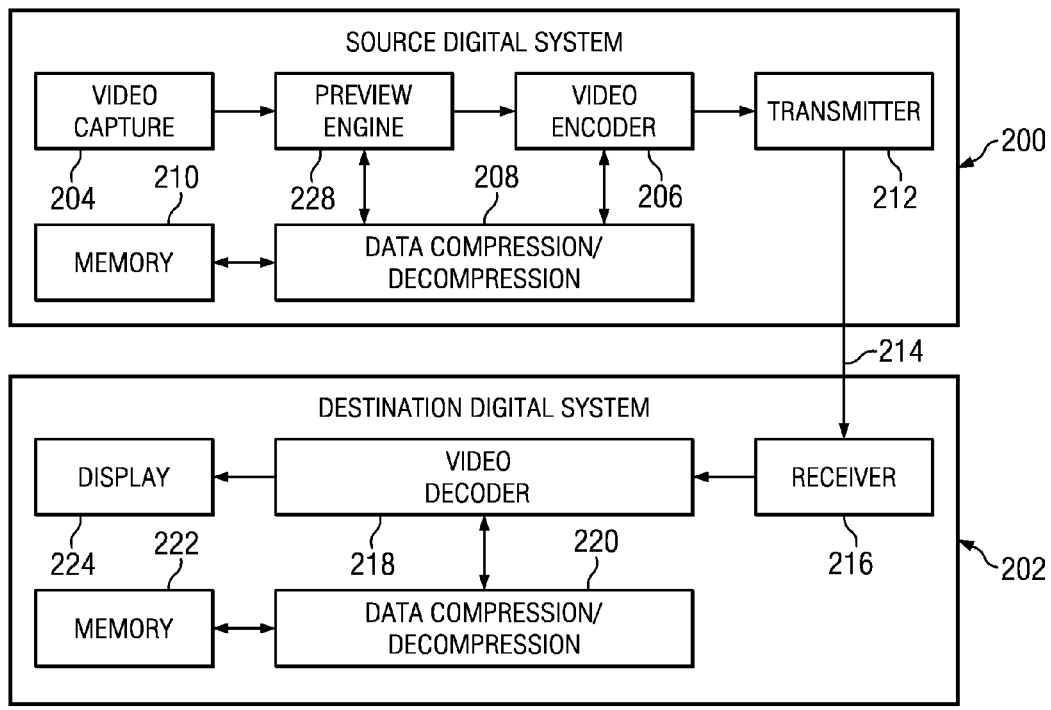
FIG. 2 shows a block diagram of a digital system in accordance with one or more embodiments of the invention.

FIG. 2 shows a block diagram of a digital system in accordance with one or more embodiments of the invention. The digital system is configured to perform compression and decompression of digital image data as described herein. The digital system includes a source digital system (200) that transmits encoded video sequences to a destination digital system (202) via a communication channel (214). The source digital system includes a video capture component (204), a preview engine (228), a data compression/decompression component (208), a memory component (210), and a video encoder component (206), and a transmitter component (212).

The video capture component (204) is configured to provide digital image data to the preview engine (228). The video capture component (204) may include, for example, an image sensor such as a charge-coupled device (CCD) or a complementary metal-oxide-semiconductor (CMOS) sensor that captures analog image information in the form of pixels. The video capture component may include a color separator to separate pixel-sequential image signals into color-separated pixel signals, such as primary red (R), green (G) and blue (B) signals. The analog color-separated pixel signals are converted to digital image signals and provided to the preview engine (228).

The preview engine (228) includes functionality to perform image pre-processing tasks on the digital input signals. The image pre-processing tasks enhance the quality of the input image and convert it into a format for further processing, e.g., Y/Cb/Cr 4:2:2 format. These tasks may include color filter array (CFA) interpolation, color space conversion, gamma correction, another image enhancement tasks such as noise filtering and RGB blending. After the pre-processing, the digital image data is compressed by the data compression/decompression component (208) and stored in the memory component (210). The compression is performed as described herein. The memory component (210) may be any suitable memory technology such as, for example, synchronous dynamic random access memory (SDRAM).

The video encoder component (206) includes functionality to encode captured, pre-processed digital image data. More specifically, the video encoder component (206) retrieves the digital image data from the memory (210) via the data compression/decompression component (208) and encodes it transmission and/or for storage in a storage component (not shown). The data compression/decompression component (208) decompresses the digital image data as described herein. The storage component may be any suitable storage technology, such as, for example, a secure digital card, an internal hard drive, etc.

In general, the video encoder component (206) retrieves the digital image data from the memory (210) as a sequence of video frames, divides the frames into coding units which may be a whole frame or a slice of a frame, divides the coding units into blocks of pixels, and encodes the digital image data in the coding units based on these blocks. During the encoding process, the video encoder component (206) uses reference frame data from previously encoded frames to encode subsequent frames. As is explained in more detail in reference to FIG. 3, the reference frame data is generated after encoding a frame and is stored, via the data compression/decompression component (208), in the memory (210). The data compression/decompression component (208) compresses the reference frame data before it is stored in the memory (210) as described herein. When the reference data is needed, the video encoder component (206) retrieves it from the memory (210) via the data compression/decompression component (208). The data compression/decompression component (208) decompresses the reference data prior to providing it to the video encoder component (206) as described herein. The functionality of one or more embodiments of the video encoder component (206) is described in more detail below in reference to FIG. 3.

The transmitter component (212) transmits the encoded video data to the destination digital system (202) via the communication channel (214). The communication channel (214) may be any communication medium, or combination of communication media suitable for transmission of the encoded video sequence, such as, for example, wired or wireless communication media, a local area network, or a wide area network.

The destination digital system (202) includes a receiver component (216), a video decoder component (218), a data compression/decompression component (220), a memory (222), and a display component (224). The receiver component (216) receives the encoded video data from the source digital system (200) via the communication channel (214) and provides the encoded video data to the video decoder component (218) for decoding.

In general, the video decoder component (218) reverses the encoding process performed by the video encoder component (206) to reconstruct the frames of the video sequence. During the decoding process, the video decoder component (218) uses reference frame data from previously decoded frames to decode subsequent frames. As is explained in more detail in reference to FIG. 4, the reference frame data is generated after decoding a frame and is stored, via the data compression/decompression component (220), in the memory (222). The data compression/decompression component (220) compresses the reference frame data before it is stored in the memory (222) as described herein. When the reference frame data is needed, the video decoder component (2186) retrieves it from the memory (222) via the data compression/decompression component (220). The data compression/decompression component (220) decompresses the reference frame data prior to providing it to the video decoder component (218) as described herein. The functionality of one or more embodiments of the video decoder component (218) is described in more detail below in reference to FIG. 4.

The reconstructed video sequence may then be displayed on the display component (244). The display component (244) may be any suitable display device such as, for example, a plasma display, a liquid crystal display (LCD), a light emitting diode (LED) display, etc.

In some embodiments of the invention, the source digital system (200) may also include a receiver component and a video decoder component and/or the destination digital system (202) may include a transmitter component and a video encoder component for transmission of video sequences both directions for video steaming, video broadcasting, and video telephony. Further, a video encoder component may include a data compression/decompression component while a video decoder component receiving the encoded video sequence does not include a data compression/decompression component and vice versa. Moreover, a video encoder component and a video decoder component receiving a video sequence encoded by the video encoder component may not both perform image data compression/decompression in the same way.

The video encoder component (206) and the video decoder component (218) may perform encoding and decoding in accordance with one or more video compression standards such as, for example, the Moving Picture Experts Group (MPEG) video compression standards, e.g., MPEG-1, MPEG-2, and MPEG-4, the ITU-T video compression standards, e.g., H.263, H.264, and HEVC, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), etc. The video encoder component (206), the preview engine (228), the video decoder component (218), and the data compression/decompression components (280, 220) may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 3:
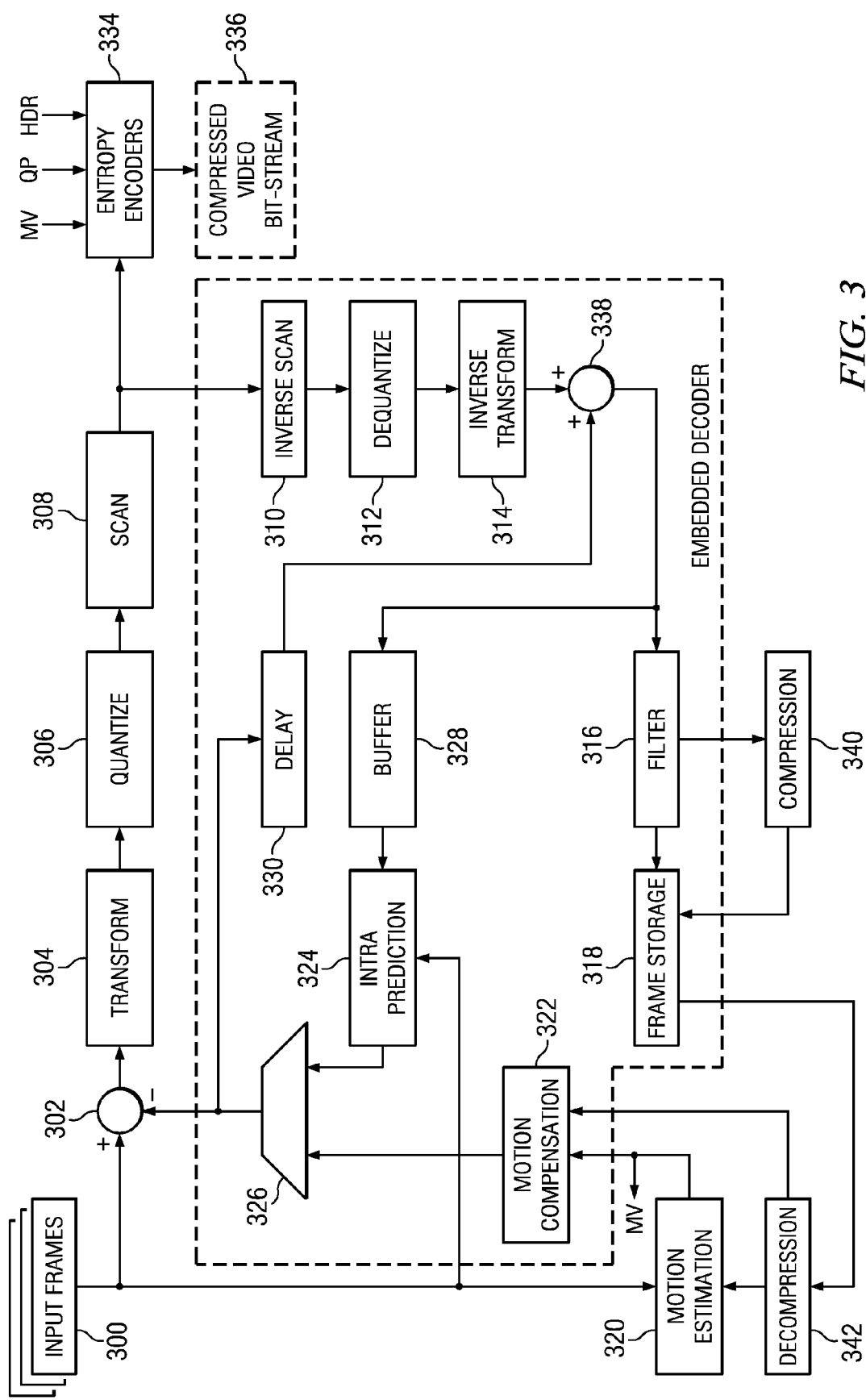
FIG. 3 shows a block diagram of a video encoder in accordance with one or more embodiments of the invention.

FIG. 3 shows a block diagram of a video encoder, e.g., the video encoder (206) of FIG. 2, in accordance with one or more embodiments of the invention. In the video encoder of FIG. 3, input frames (300) for encoding are divided into coding blocks, e.g., macroblocks, and the coding blocks are provided as one input of a motion estimation component (320), as one input of an intra prediction component (324), and to a positive input of a combiner (302) (e.g., adder or subtractor or the like). Further, although not specifically shown, a prediction mode, i.e., inter-prediction or intra-prediction, for each input frame is selected and provided to a mode selector component and the entropy encoders (334). In one or more embodiments of the invention, to reduce memory bandwidth requirements, the input frames (300) may be stored in compressed format in a memory (not shown) and decompressed prior to being provided to the components of the video encoder. The compression and decompression of the input frames (300) is performed as described herein.

The frame storage component (318) stores reference frame generated by the embedded decoder and used by the motion estimation component (320) and the motion compensation component (322). The reference frame data may include one or more previously encoded and decoded frames. In some embodiments of the invention, the frame storage component (318) is external memory, i.e., off-chip memory. In some embodiments of the invention, to reduce memory bandwidth requirements, the reference frame data is compressed by the compression component (340) prior to storage in the frame storage component (318) and is decompressed by the decompression component (342) prior to being provided to the motion estimation component (320) and the motion compensation component (322). The compression component (340) performs compression as described herein and the decompression component (342) performs decompression as described herein.

The motion estimation component (320) provides motion estimation information to the motion compensation component (322) and the entropy encoders (334). More specifically, the motion estimation component (320) performs tests on coding blocks based on multiple temporal prediction modes using reference frame data to choose the best motion vector(s)/prediction mode based on a coding cost. To test the prediction modes, the motion estimation component (320) may divide a coding block into prediction blocks according to the block size of a prediction mode. The motion estimation component (320) provides the selected motion vector (MV) or vectors and the selected prediction mode to the motion compensation component (322) and the selected motion vector (MV) to the entropy encoders (334). The motion compensation component (322) provides motion compensated inter prediction information to a selector switch (326) that includes motion compensated inter prediction blocks and the selected temporal prediction modes. The coding cost of the inter prediction blocks are also provided to the mode selector component.

The intra prediction component (324) provides intra prediction information to the selector switch (326) that includes intra prediction blocks and the corresponding spatial prediction modes. That is, the intra prediction component (324) performs spatial prediction in which tests based on multiple spatial prediction modes are performed on the coding block using previously encoded neighboring blocks of the frame from the buffer (328) to choose the best spatial prediction mode for generating an intra prediction block based on a coding cost. To test the spatial prediction modes, the intra prediction component (324) may divide a coding block into prediction blocks according to the block size of a prediction mode. Although not specifically shown, the coding cost of the intra prediction blocks are also provided to the mode selector component.

The selector switch (326) selects between the motion-compensated interframe prediction blocks from the motion compensation component (322) and the intra prediction blocks from the intra prediction component (324) based on the difference metrics of the blocks and a frame prediction mode provided by the mode selector component. The output of the switch (326) (i.e., the predicted prediction block) is provided to a negative input of the combiner (302) and to a delay component (330). The output of the delay component (330) is provided to another combiner (i.e., an adder) (338). The combiner (302) subtracts the predicted prediction block from the current prediction block of the current coding block to provide a residual prediction block to the transform component (304). The resulting residual prediction block is a set of pixel difference values that quantify differences between pixel values of the original prediction block and the predicted prediction block.

The transform component (304) performs a block transform e.g., a discrete cosine transform (DCT), on the residual prediction blocks to convert the residual pixel values to transform coefficients and outputs the transform coefficients. The transform coefficients are provided to a quantization component (306) which outputs quantized transform coefficients. Because the block transform redistributes the energy of the residual signal into the frequency domain, the quantized transform coefficients are taken out of their raster-scan ordering and arranged by significance, generally beginning with the more significant coefficients followed by the less significant by a scan component (308). The ordered quantized transform coefficients provided via the scan component (308) along with header information are coded by the entropy encoder (334), which provides a compressed bit stream (336) for transmission or storage. The entropy coding performed by the entropy encoder (334) may be any suitable entropy encoding techniques, such as, for example, context adaptive variable length coding (CAVLC), context adaptive binary arithmetic coding (CABAC), run length coding, etc.

Inside every encoder is an embedded decoder. As any compliant decoder is expected to reconstruct an image from a compressed bitstream, the embedded decoder provides the same utility to the video encoder. Knowledge of the reconstructed input allows the video encoder to transmit the appropriate residual energy to compose subsequent frames. To determine the reconstructed input, i.e., the reference frame data, the ordered quantized transform coefficients provided via the scan component (308) are returned to their original post-DCT arrangement by an inverse scan component (310), the output of which is provided to a dequantize component (312), which outputs estimated transformed information, i.e., an estimated or reconstructed version of the transform result from the transform component (304). The estimated transformed information is provided to the inverse transform component (314), which outputs estimated residual information which represents a reconstructed version of the residual prediction block. The reconstructed residual prediction block is provided to the combiner (338).

The combiner (338) adds the delayed selected prediction block to the reconstructed residual prediction block to generate an unfiltered reconstructed prediction block, which becomes part of the reconstructed frame information. The reconstructed frame information is provided via a buffer (328) to the intra prediction component (324) and to a filter component (316). The filter component (316) is an in-loop filter which filters the reconstructed frame information and provides filtered reconstructed coding blocks, i.e., reference frame data, to the frame storage component (318). In some embodiments of the invention, the reconstructed frames are compressed by the compression component (340) as described herein prior to providing them to the frame storage component (318).

Figure 4:
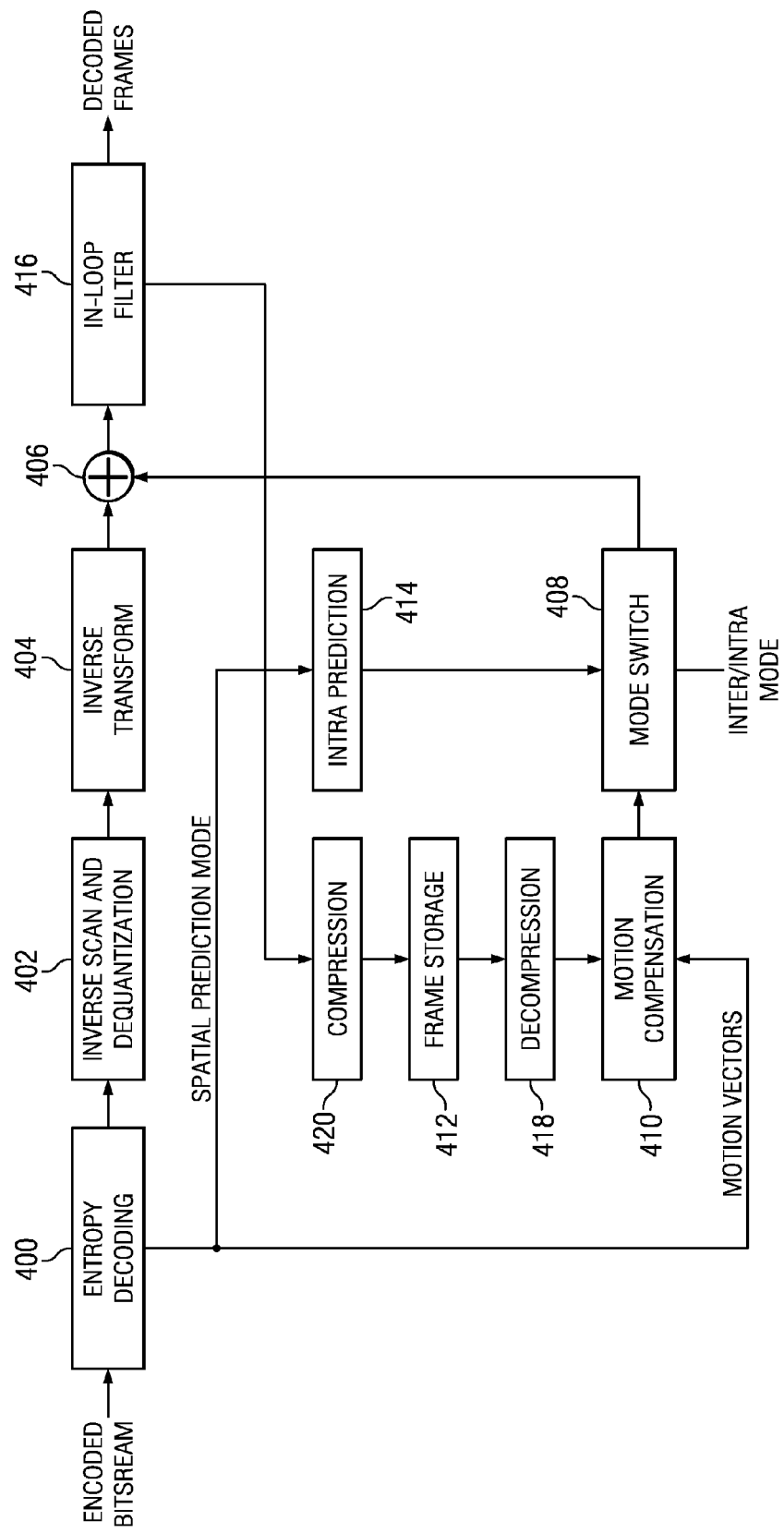
FIG. 4 shows a block diagram of a video decoder in accordance with one or more embodiments of the invention.

FIG. 4 shows a block diagram of a video decoder, e.g., the video decoder (218) of FIG. 2, in accordance with one or more embodiments of the invention. In the video decoder of FIG. 4, the entropy decoding component 400 receives an entropy encoded video bit stream and reverses the entropy encoding to recover the encoded coding blocks. The entropy decoding performed by the entropy decoder component (400) may include functionality to perform one or more of any suitable entropy decoding techniques, such as, for example, context adaptive variable length decoding (CAVLC), context adaptive binary arithmetic decoding (CABAC), run length decoding, etc.

The inverse scan and dequantization component (402) assembles the coding blocks in the video bit stream in raster scan order and substantially recovers the original frequency domain data, de-quantized residual coefficients. The inverse transform component (404) transforms the frequency domain data from the inverse scan and dequantization component (402) back to a residual prediction block. That is, the inverse transform component (404) applies an inverse block transform, i.e., the inverse of the block transform used for encoding, to the de-quantized residual coefficients to produce the residual prediction block.

This residual prediction block supplies one input of the addition component (406). The other input of the addition component (406) comes from the mode switch (408). When inter-prediction mode is signaled in the encoded video stream, the mode switch (408) selects a prediction block from the motion compensation component (410) and when intra-prediction is signaled, the mode switch selects a prediction block from the intra prediction component (414).

The frame storage component (412) stores reference frame data generated by the decoder and used by the motion compensation component (410). The reference frame data may include one or more previously encoded and decoded frames. In some embodiments of the invention, the frame storage component (412) is external memory, i.e., off-chip memory. In some embodiments of the invention, to reduce memory bandwidth requirements, the reference frame data is compressed by the compression component (420) prior to storage in the frame storage component (412) and is decompressed by the decompression component (418) prior to being provided to the motion compensation component (410). The compression component (420) performs compression as described herein and the decompression component (418) performs decompression as described herein.

The motion compensation component (410) receives reference frame data from the frame storage component (412) and applies the motion compensation computed by the encoder and transmitted in the encoded video bit stream to the reference frame data to generate a prediction block. The intra prediction component (414) receives previously decoded prediction blocks from the current frame and applies the intra-prediction computed by the encoder as signaled by a spatial prediction mode transmitted in the encoded video bit stream to the previously decoded prediction blocks to generate a prediction block.

The addition component (406) recovers the predicted prediction block, i.e., generates a decoded prediction block, by adding the selected prediction block and the residual prediction block. The output of the addition component (406) supplies the input of the in-loop filter component (416). The in-loop filter component (416) smoothes artifacts created by the block nature of the encoding process to improve the visual quality of the decoded frame. The output of the in-loop filter component (416) is the decoded frames of the video bit stream. Each decoded prediction block is stored in the frame storage component (412) to be used as reference frame data. Further, reference frame data may be stored for multiple previously encoded frames.

Before describing the image data compression and decompression of embodiments of the invention, information regarding techniques used in one or more embodiments is presented. Recall from FIG. 1 that the basic components of image data compression are transformation, prediction, quantization, and entropy coding, and the basic components of image data decompression are entropy decoding, dequantization, reconstruction, and inverse transformation.

The transformation selection of one or more embodiments of the invention is chosen such that it enables lossless compression when quantization is not used, with a hardware-friendly design; further, it can easily be modified to perform lossy compression as well. In image processing and compression, Discrete Wavelet Transform (DWT) is widely used, and over the last two decades it proved itself to be a very efficient and powerful transformation technique. There are several techniques that are based on the use of wavelet transform such as those described in J. Shapiro, "Embedded image coding using zerotree of wavelet coefficients," IEEE Trans. Signal Processing, vol. 41, pp. 3445-3463, December 1993, A. Said and W. Pearlman, "A new, fast, and efficient image codec based on set partitioning in hierarchical trees," IEEE Trans. Circuits Syst. Video Technol., vol. 6, pp. 243-250, June 1996, and D. Taubman, "High performance scalable image compression with EBCOT," IEEE Trans. Image Processing, vol. 9, pp. 1158-1170, 2000. However, the coefficients of DWT are floating-point numbers, thus requiring computational complexity that makes them unappealing for many lossless coding applications. On the other hand, the lifting scheme (LS) originally presented by W. Sweldens, "The lifting scheme: A custom-design construction of biorthogonal wavelets," Appl. Comput. Harmon. Anal., vol. 3, pp. 186-200, April 1996, enables a low-complexity and more efficient implementation of DWT.

Figure 5:
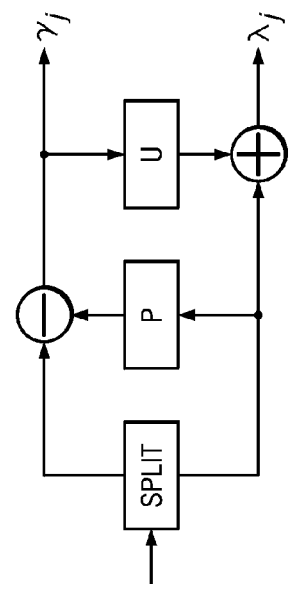
FIG. 5 shows a block diagram illustrating one step forward lifting in accordance with one or more embodiments of the invention.

R. Calderbank, et al., "Wavelet transforms that map integers to integers," Appl. Comput. Harmon. Anal., vol. 5, pp. 332-369, July 1998 presents a technique based on LS, referred to as Integer Wavelet Transform (IWT). IWT enables a direct fixed-point implementation, enables lossless coding, and enables a low-complexity implementation. Since IWT approximates the parent linear transforms, the efficiency of IWT may not be as good as the efficiency of DWT for lossy compression. In IWT, forward lifting is used to split a signal into low frequency transform coefficients and high frequency transform coefficients. One step forward lifting is illustrated in FIG. 5, where P denotes prediction and U denotes the update stages. The inverse transform is obtained by reversing the steps of the forward transform and flipping the signs.

In A. Said and W. Pearlman, "An image multiresolution representation for lossless and lossy compression," IEEE Trans. Image Processing, vol. 5, pp. 1303-1310, September 1996, several IWTs are compared according to their lossy and lossless compression performance and computational complexity. Although, there is no one best IWT transform for all classes of images, S and 5/3 transform are very attractive due to their lower computational complexities and comparable performance. The complexity of S transform is lower than 5/3 transform but it may perform slightly worse than the 5/3 transform.

Forward and inverse 5/3 transformation equations for one lifting step are as below:

$$\text{Forward:} \begin{cases} y[2n+1] = x[2n+1] - \left\lfloor \frac{x[2n] + x[2n+2]}{2} \right\rfloor \\ y[2n] = x[2n] + \left\lfloor \frac{y[2n-1] + y[2n+1]}{4} + \frac{1}{2} \right\rfloor \end{cases}$$

$$\text{Inverse:} \begin{cases} x[2n] = y[2n] - \left\lfloor \frac{y[2n-1] + y[2n+1]}{4} + \frac{1}{2} \right\rfloor \\ x[2n+1] = y[2n+1] + \left\lfloor \frac{x[2n] + x[2n+2]}{2} \right\rfloor \end{cases}$$

where x, y[2n], and y[2n+1] are input, low-pass subband, and high-pass subband signals, respectively. Similarly, forward and inverse S transformation equations for one lifting step are as below:

$$\text{Forward:} \begin{cases} y[2n+1] = x[2n+1] - x[2n] \\ y[2n] = x[2n] + \left\lfloor \frac{y[2n+1]}{2} \right\rfloor \end{cases}$$

$$\text{Inverse:} \begin{cases} x[2n] = y[2n] - \left\lfloor \frac{y[2n+1]}{2} \right\rfloor \\ x[2n+1] = y[2n+1] + x[2n] \end{cases}$$

Usually, more than one lifting step is employed. This may be achieved by cascading the lifting step of FIG. 5 for approximation terms for the desired number of lifting steps. The inverse lifting steps are also similarly obtained similarly for more than one lifting step. Note that the number of lifting steps is the same as the number of scales in DWT. Further, a lifting step may also be referred to as a level. The number of lifting steps used may depend on the size of the data to be transformed and the desired level of compression. For example, for a 16×16 block of pixels, a maximum of 4 lifting steps may be used. If all 4 lifting steps are used, the end result is one low frequency transform coefficient and 4 levels of high frequency transform coefficients. If fewer lifting steps are used, the number of low frequency transform coefficients increases and the number of levels of high frequency transform coefficients decreases. Similarly, for an 8×8 block of pixels, a maximum of 3 lifting steps will result in one low frequency transform coefficient and 3 levels of high frequency transform coefficients. For a 4×4 block of pixels, a maximum of 2 lifting steps will result in one low frequency transform coefficient and 2 levels of high frequency transform coefficients. For tiled image data, i.e., image data in two dimensional (2D) blocks, 2D IWT is applied in the horizontal and vertical directions consecutively. The order of application is not important; however, the forward and inverse transforms will reverse whatever order is used.

Predictive coding is a widely used technique in audio-visual data compression. Instead of encoding a signal directly, the difference between the signal and its prediction is encoded. This technique achieves better compression efficiency because the video signals are correlated in spatial and temporal dimensions. In embodiments of the invention, a low frequency transform coefficient (DC coefficient) of a block is spatially predicted based on corresponding DC coefficients in one or more previously compressed neighboring blocks in the same frame. For example, the neighboring blocks used for the spatial prediction may be the left, top, and top-left neighboring blocks. In another example, the neighboring blocks used for the spatial prediction may also include one or more blocks neighboring these blocks, for example, the left neighboring block of the left neighboring block, the top neighboring block of the top neighboring block, and the top neighboring block of the top-left neighboring block. Applying spatial prediction to the DC coefficients is useful because DC coefficients are more correlated in the spatial dimension than the higher frequency (AC) coefficients, and values of the DC coefficients are generally larger than the AC coefficients, hence more bits are needed for them in entropy encoding. In one or more embodiments of the invention, spatial prediction is performed separately for luminance and chrominance blocks. That is, each block of a frame is split into luminance and chrominance blocks before being compressed.

In some embodiments of the invention, the spatial prediction may be performed as follows. Let A, B, and C be the DC coefficients of the top-left, top and left neighbors of the block to be compressed. The DC coefficient of the current block (X) may be predicted as follows:

$$dir(X) = \min\left\{|A - B|, |A - C|, \left|A - \frac{B+C}{2}\right|\right\},$$

$$pred(X) = \begin{cases} C, & \text{if } dir(X) = |A - B|, \text{ or } B \text{ is not available} \\ B, & \text{if } dir(X) = |A - C|, \text{ or } C \text{ is not available} \\ (B+C)/2, & \text{if } dir(X) = |A - (B+C)/2| \\ 0, & \text{if both } B \text{ and } C \text{ are not available} \end{cases}$$

The residual DC coefficient is computed by subtracting the prediction from the actual DC coefficient value. The decompression performs the same prediction procedure and reconstructs the DC coefficient by adding the residual to the prediction.

The choice of the quantization function used to obtain the integer values affects the compression performance, especially at higher bit rates, which is the case in near-lossless and lossless compression. Any suitable quantization may be used. However, simulation results, and the literature, show that the midtread quantizer performs better than the deadzone quantizer for most images. Hence, in one or more embodiments of the invention, midtread quantization is used to minimize the degradation. Descriptions of midtread and deadzone quantization may be found in J. Liang, "ENSC 424—Multimedia Communications Engineering, Topic 7: Quantization 1", Simon Fraser University, Sep. 27, 2005, available at http://www.ensc.sfu.ca/~jiel/courses/424/slides/07_Quantization_1.pdf.

Different entropy encoding methods are best suited for different image data statistics. Golomb-Rice (GR) and Exponential-Golomb (EG) codes are very attractive as they do not require any table lookup or extensive calculation. In fact, they can be parameterized using a single integer and are simple to implement both in hardware and software. Both of the codes are among the variable length coding (VLC) techniques. GR codes were originally proposed in S. W. Golomb, "Run-length encodings," IEEE Trans. Inform. Theory, vol. 12, pp. 388-401, July 1966. EG codes were originally proposed in J. Teuhola, "A Compression Method for Clustered Bit-Vectors", Information Processing Letters, Vol. 7, pp. 308-311, October 1978 in the context of run-length coding that is parameterized by an integer k and expressed as GR($2^k$) and EG(k), for k=0, 1, 2, . . . , respectively. The integer k may be referred to as the order of the GR or EG code.

An EG(k) code for a positive symbol X is obtained by concatenation of a prefix code and a suffix code. The prefix code is obtained by unary coding of the value $$M = \left\lfloor \log_2\left(\frac{x}{2^k} + 1\right) \right\rfloor,$$

i.e., M number of zeros (or ones) followed by a one (or zero). The suffix code is an M+k bit binary representation of r=x−$2^k(2^M-1)$, where $0 \leq r \leq 2^{k+M}$. Hence, the resulting codeword is in the following format:

$$\underbrace{00 \ldots 001}_{\text{prefix code}} \underbrace{x_{M+k-1} x_{M+k-2} \ldots x_1 x_0}_{\text{suffix code}}$$

Table 1 shows EG codes for k=1, 2, 3, and 4 for values of x between 0 and 15. Different values of k are better suited to different image data statistics. For example, EG(0) may better suit data statistics with Laplacian distributed values ranging between 1 and 10. As can be seen from Table 1, as the range of values become larger, the EG codes with larger k values might become more suitable.

TABLE 1

| Symbol n | Codeword k = 0 | Bits | Codeword k = 1 | Bits | Codeword k = 2 | Bits | Codeword k = 3 | Bits |
|---|---|---|---|---|---|---|---|---|
| 0 | 1 | 1 | 10 | 2 | 100 | 3 | 1000 | 4 |
| 1 | 0 10 | 3 | 11 | 2 | 101 | 3 | 1001 | 4 |
| 2 | 0 11 | 3 | 0 100 | 4 | 110 | 3 | 1010 | 4 |
| 3 | 00 100 | 5 | 0 101 | 4 | 111 | 3 | 1011 | 4 |
| 4 | 00 101 | 5 | 0 110 | 4 | 0 1000 | 5 | 1100 | 4 |
| 5 | 00 110 | 5 | 0 111 | 4 | 0 1001 | 5 | 1101 | 4 |
| 6 | 00 111 | 5 | 00 1000 | 6 | 0 1010 | 5 | 1110 | 4 |
| 7 | 000 1000 | 7 | 00 1001 | 6 | 0 1011 | 5 | 1111 | 4 |
| 8 | 000 1001 | 7 | 00 1010 | 6 | 0 1100 | 5 | 0 10000 | 6 |
| 9 | 000 1010 | 7 | 00 1011 | 6 | 0 1101 | 5 | 0 10001 | 6 |
| 10 | 000 1011 | 7 | 00 1100 | 6 | 0 1110 | 5 | 0 10010 | 6 |
| 11 | 000 1100 | 7 | 00 1101 | 6 | 0 1111 | 5 | 0 10011 | 6 |
| 12 | 000 1101 | 7 | 00 1110 | 6 | 00 10000 | 7 | 0 10100 | 6 |
| 13 | 000 1110 | 7 | 00 1111 | 6 | 00 10001 | 7 | 0 10101 | 6 |
| 14 | 000 1111 | 7 | 000 10000 | 8 | 00 10010 | 7 | 0 10110 | 6 |
| 15 | 0000 10000 | 9 | 000 10001 | 8 | 00 10011 | 7 | 0 10111 | 6 |

Unary coding is another simple entropy encoding method that represents non-negative integer, n, with n zeros followed by a one. For instance, value 0 is represented as 1 and 3 is represented as 0001. Unary encoding is optimal if symbols have a discrete probability distribution of $P(n)=2^{-(n+1)}$. Sayood, K. "Introduction to Data Compression, Third Edition, (Morgan Kaufmann Series in Multimedia Information and Systems)," Morgan Kaufmann Publishers Inc., 2005, pp. 65-67, provides a description of unary coding.

The Rate-Distortion (RD) optimization problem can be stated in different ways: budget-constrained, distortion-constrained, delay constrained, etc. A. Ortega and K. Ramchandran, "Rate-distortion methods for image and video compression," IEEE Signal Processing Mag., vol. 15, pp. 23-50, November 1998, describe several different rate-distortion techniques. In embodiments of the invention, budget-constrained RD optimization is used. That is, the rate of compression is guaranteed not to exceed a predetermined threshold, $R_T$. Mathematically, the budget-constrained RD problem can be stated as $$\text{minimize} \quad D = f(d_1^{q_1}, d_2^{q_2}, d_3^{q_3}, \ldots, d_N^{q_N})$$

$$\text{such that} \quad R = \sum_{i=1}^{N} r_i^{q_i} \leq R_T$$

where N is the number of coding units and each coding unit has M different available operating points, i.e., M different quantizers. For each coding unit i, $r_i^{q_i}$ denotes its rate and $d_i^{q_i}$ denotes its distortion when using quantizer $q_i \in \{1, 2, \ldots, M\}$. $q_i=1$ means no quantization, and an increasing value of $q_i$ implies an increasing amount of quantization, i.e., $q_i=M$ denotes the largest amount of quantization.

In the above formulation, the distortion metric $f(d_1^{q_1}, d_2^{q_2}, d_2^{q_3}, \ldots, d_N^{q_N})$ can be any function of distortion. In one or more embodiments of the invention, minimum average distortion is of interest, hence $$f(d_1^{q_1}, d_2^{q_2}, d_3^{q_3}, \ldots, d_N^{q_N}) = \sum_{i=1}^{N} d_i^{q_i}.$$

This optimization problem can be effectively solved using dynamic programming methods such as the Viterbi algorithm or Dijkstra's shortest-path algorithm. Although the optimal solution is obtained with these algorithms, they may be too computationally complex for use in many applications. Another alternative is to use Lagrangian optimization, i.e., to minimize J=D+λR. To achieve the optimal solution using the Lagrangian optimization, the optimal λ value is needed so that the resulting rate is close or equal to the set budget limit. However, finding the right λ requires that $r_i^{q_i}$ and $d_i^{q_i}$ be available for all coding units, and that increases the complexity. Hence, this technique may also be too computationally complex for use in many applications.

In some embodiments of the invention, the complexity is reduced by modifying the problem to allow a sub-optimal solution. More specifically, additional N−1 constraints are added as below:

$$\text{minimize } D = f(d_1^{q_1}, d_2^{q_2}, d_3^{q_3}, \ldots, d_N^{q_N})$$

$$\text{such that } R = \sum_{i=1}^{N} r_i^{q_i} \leq R_T$$

$$\sum_{i=1}^{k} r_i^{q_i} \leq R_T \frac{k}{N} \quad k = 1, \ldots, N-1$$

Hence, the sub-optimal solution is obtained by deciding each $q_i$ at a time as follows. For the first coding unit choose the lowest $q_1$ value such that, $$r_1^{q_1} \leq R_T \frac{1}{N}$$

is satisfied. Then, for the following coding units choose the lowest $q_k$ value such that, $$\sum_{i=1}^{k} r_i^{q_i} = \sum_{i=1}^{k-1} r_i^{q_i} + r_k^{q_k} \leq R_T \frac{k}{N}$$

$$k = 2, \ldots, N$$

or equivalently, $$r_k^{q_k} \leq R_T \frac{k}{N} - \sum_{i=1}^{k-1} r_i^{q_i}$$

$$k = 2, \ldots, N$$

$$r_k^{q_k} \leq R_T \frac{1}{N} + \left( R_T \frac{k-1}{N} - \sum_{i=1}^{k-1} r_i^{q_i} \right)$$

$$k = 2, \ldots, N$$

is satisfied. The term in parentheses is the accumulated unused bit-rate from the previous coding units. The accumulated unused bit-rate may be distributed more prudently among the next L coding units by modifying the formulation as below:

$$\text{minimize } D = f(d_1^{q_1}, d_2^{q_2}, d_3^{q_3}, \ldots, d_N^{q_N})$$

$$\text{such that } \sum_{i=1}^{N} r_i^{q_i} \leq R_T$$

$$r_k^{q_k} \leq R_T \frac{1}{N} + \frac{1}{L} \left( R_T \frac{k-1}{N} - \sum_{i=1}^{k-1} r_i^{q_i} \right) k = 1, \ldots, N-1$$

An alternative technique for better statistical averaging of the bit-rate budget over the coding units is to use a leaky-bucket like approach. In this technique, the initial bit-rate constraint is relaxed such that:

$$r_1^{q_1} \leq B + R_T \frac{1}{N}$$

For the subsequent coding units, the extra initial bit-rate (B) is gradually reduced to guarantee that the rate constraint, $R_T$, is satisfied for the set of N coding units:

$$r_k^{q_k} \leq B \left( 1 - \frac{k-1}{N-1} \right) + R_T \frac{k}{N} - \sum_{i=1}^{k-1} r_i^{q_i}$$

$$k = 2, \ldots, N$$

Then, the resulting $q^* = [q_1^*, q_2^*, \ldots, q_N^*]$, is the sub-optimal set of quantizers. The value of B may be empirically determined. For example, the value may be based on the image data block size and the desired maximum compression rate. For example, consider an 80×80 frame divided into 100 8×8 blocks. For simplicity, assume a gray scale image with only luminance data. Each block then has 512 bits. If the desired maximum compression rate is 2, then a compress block would have at most 256 bits. If each block is allocated an additional 4 bits, then B is 100×4=400 bits.

The formulation can be further simplified by removing the use of accumulated unused bit-rate from previous coding units. This results in the following formulation where each coding unit is limited to use an equal maximum limit of $R_T$ 1/N:

$$\text{minimize } D = f(d_1^{q_1}, d_2^{q_2}, d_3^{q_3}, \ldots, d_N^{q_N})$$

$$\text{such that } \sum_{i=1}^{N} r_i^{q_i} \leq R_T$$

$$r_k^{q_k} \leq R_T \frac{1}{N} \quad k = 1, \ldots, N-1$$

Figure 6:
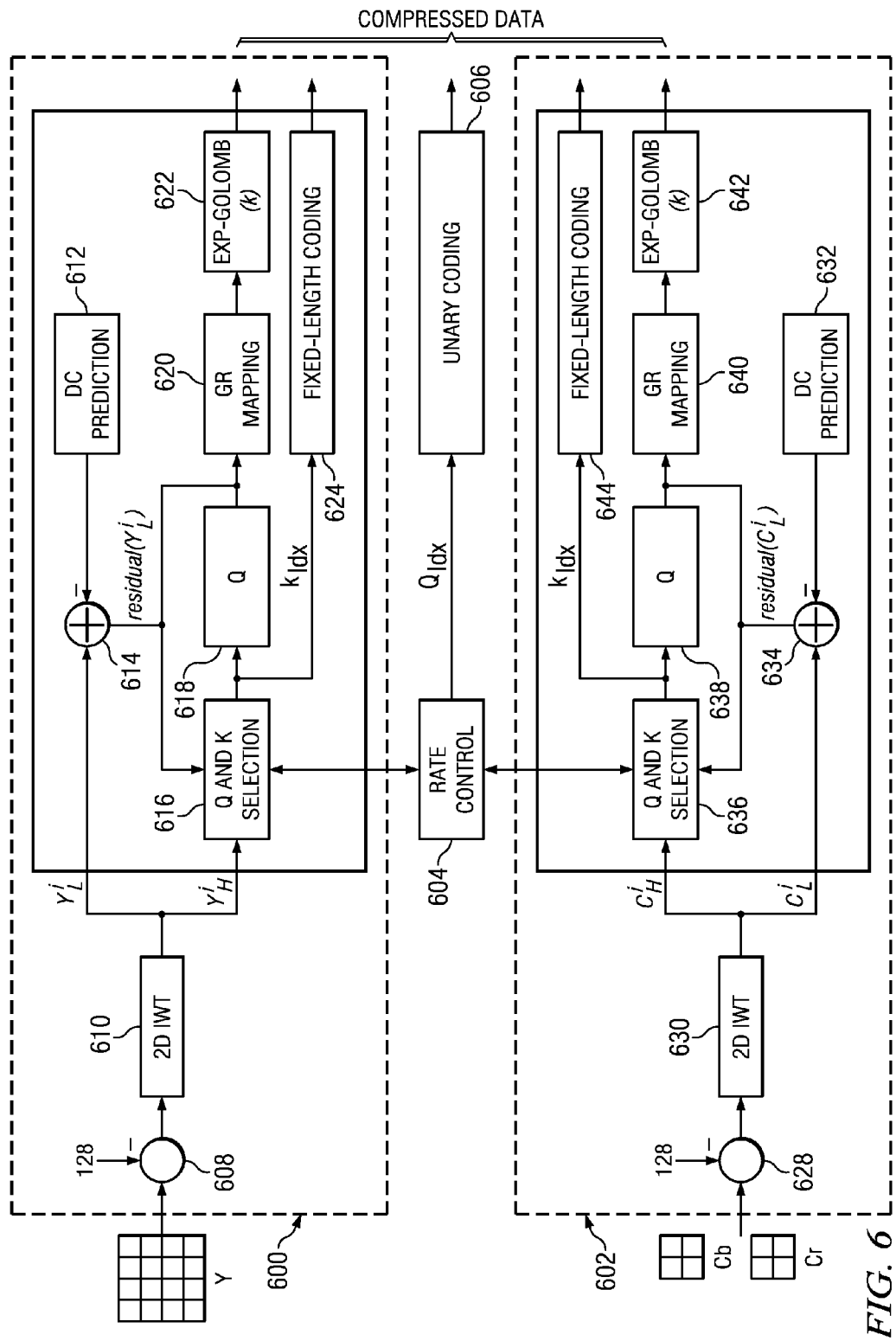
FIG. 6 shows a block diagram of an image data compression system in accordance with one or more embodiments of the invention.

FIG. 6 shows a block diagram of an image data compression system, e.g., a compression component (340) or a compression component (420), in accordance with one or more embodiments of the invention. The image data compression system operates on tiles of image data. That is, a frame to be compressed is divided into rectangular tiles, i.e., image data blocks, of the same size. In some embodiments of the invention, the size of a block is chosen such that the width and height of the frame is evenly divided, and is a multiple of $2^{scales}$ where scales is the number of levels used in the IWT. In some embodiments of the invention, the size of a block does not evenly divide the frame. In such embodiments, blocks that do not contain a full complement of image data from a frame may be padded, for example, by using zeroes for the missing data, repeating the last pixel value, or mirroring. The image data may be any chroma sampling format, such as, for example 4:4:4, 4:2:2, or 4:2:0. If the incoming data is in RGB format, then a reversible component transformation (RCT) can be used for RGB to YCbCr conversion. The pixel data, luminance (Y) and chrominance (C), in an image data block is split into luminance data and chrominance data, which are compressed separately.

Compressed data for each frame is obtained by concatenating the compressed data of each block. For each block, the compressed data is composed of a header and compressed coefficient data for each of the luminance data and chrominance data. The header includes a unary coded index for the quantization parameter used to quantize the high-frequency coefficients of the luminance data and the chrominance data, a fixed-length coded index for the entropy coding parameter k used in entropy coding the luminance data, and a fixed-length coded index for the entropy coding parameter k used in entropy coding the chrominance data. The number of bits needed to encode the two entropy coding parameter indices depends on the number of possible values for the entropy coding parameter k. For example, if k is allowed to have two values, one bit may be used to indicate the index of the value used, and two bits may be used in the header to encode the two indices.

For simplicity of explanation, the system of FIG. 6 assumes a chroma sampling format of 4:2:0 and a block size of 4×4. One of ordinary skill in the art will understand embodiments of the invention using other chroma sampling formats and/or other block sizes. The pixel data, luminance (Y) and chrominance (C), in an image data block is initially split to form a 4×4 luminance block Y, i.e., a block of luminance pixels, and two 2×2 chrominance blocks, Cb and Cr, i.e., blocks of chrominance pixels.

The image data compression system includes a luminance compression subsystem (600), a chrominance compression subsystem (602), a rate control component (604), and a unary coding component (606). The luminance block Y is input to the luminance compression subsystem (600) and the chrominance blocks Cb and Cr are input to the chrominance compression subsystem (602).

The luminance compression subsystem (600) includes a normalization component (608), a 2D IWT component (610), a Q and k selection component (616), a DC prediction component (612), a quantization component (618), a combiner (614), a GR mapping component (620), an entropy coding component (622), and a fixed-length coding component (624). The normalization component (608) subtracts 128 from each pixel in the luminance block Y to center the pixel values around 0.

The 2D IWT component (610) performs a two dimensional integer wavelet transform on the luminance block Y to split the luminance data into one or more low-frequency luminance transform coefficients $Y_L^i$ and multiple levels of high-frequency luminance transform coefficients $Y_H^i$ (i denotes the block number) which may also be referred to as low-frequency and high-frequency luminance components or approximate and detail data or DC coefficients and AC coefficients. Any suitable IWT technique may be used. Further, the IWT may use any suitable number of lifting steps. As was previously explained, the number of lifting steps used depends on the size of the block to be transformed and the desired level of compression.

In one or more embodiments of the invention, the 2D IWT component (610) implements a 5/3 IWT as previously described. In some such embodiments, a sufficient number of lifting steps is used to result in one low frequency luminance transform coefficient to achieve maximum compression. In some embodiments of the invention, the 2D IWT component (610) implements an S IWT as previously described. In some such embodiments, a sufficient number of lifting steps is used to result in one low frequency luminance transform coefficient to achieve maximum compression.

For simplicity of explanation, the output of the 2D IWT component (610) is assumed to be one low-frequency luminance transform coefficient $Y_L^i$ and multiple levels of high-frequency luminance transform coefficients $Y_H^i$. One of ordinary skill in the art will understand other embodiments of the invention in which multiple low-frequency transform coefficients are used. The low frequency luminance transform coefficient $Y_L^i$ is provided as an input to the combiner (614) and the high-frequency luminance transform coefficients $Y_H^i$ are provided as an input to the Q and k selection component (616).

The DC prediction component (612) spatially predicts the low-frequency transform coefficient of the luminance block Y based on the low-frequency luminance transform coefficients of previously compressed neighboring blocks in the same frame. In one or more embodiments of the invention, the neighboring blocks used are the top left, top, and left neighboring blocks, and the predicted low-frequency luminance transform coefficient is computed as previously described. The predicted low-frequency luminance transform coefficient is provided as a second input to the combiner (614).

The combiner (614) subtracts the predicted low-frequency transform coefficient from the computed low-frequency transform coefficient (from the 2D IWT component (610)) to determine the residual low-frequency transform coefficient. The residual low-frequency transform coefficient is provided as one input of the GR mapping component (620) and as one input of the Q and k selection component (616).

The Q and k selection component (616) coordinates the selection of the quantization parameter Q to be used to quantize the high-frequency transform coefficients $Y_H^i$ and the parameter k for the entropy coding of the quantized high-frequency transform coefficients $Y_H^i$ and the residual low-frequency transform coefficient $Y_L^i$. More specifically, the Q and k selection component (616) interacts with the rate control component (604) in the selection of a suitable quantization parameter Q and entropy coding parameter k such that the desired compression rate is achieved. As is explained in more detail below in the description of the rate control component (604), the value of the quantization parameter Q is selected jointly with the value of the entropy coding parameter k to determine values that give the minimum total coded length for the low and high-frequency coefficients. Further, the values of these parameters are selected jointly with the values of these parameters for the chrominance blocks.

The Q and k selection component (616) provides the selected entropy coding parameter k to the entropy coding component (622) and an index identifying the selected k value to the fixed-length coding component (624). Note that if k may take on two values, the possible values of the index may be 0 and 1. The Q and k selection component (616) also provides the selected quantization parameter Q to the quantization component (618) along with the high-frequency transform coefficients $Y_H^i$.

The quantization component (618) quantizes the high-frequency transform coefficients $Y_H^i$ according to the quantization parameter Q. Any suitable quantization technique may be used. In one or more embodiments of the invention, the quantization component (618) performs midtread quantization as previously described. The quantized high-frequency transform coefficients are provided as an input to the GR mapping component (620).

The quantization parameter Q indicates which of multiple quantization levels supported by the quantization component (638) is to be used to quantize the high-frequency transform coefficients $Y_H^i$. In one or more embodiments of the invention, twelve quantization levels are provided. Each quantization level corresponds to a vector having a quantization step size for each level of the high frequency transform coefficients $Y_H^i$. For example, if the luminance block size is 16×16, and four lifting steps are used in the IWT, there will be one low-frequency transform coefficient and four levels of high-frequency transform coefficients, H1, H2, H3, H4. Accordingly, the quantization vector at each quantization level has four elements where each element is a quantization step size for H1, H2, H3, H4, respectively. The quantization step sizes at each quantization level may be determined empirically, e.g., based on simulation results.

In general, the quantization step sizes at each increasing quantization level are increased gradually to maintain an approximate relationship between distortion and rate. For example, the quantization step sizes at Q=1 may provided minimum distortion and maximum rate (length) while the quantization step sizes at Q=12 may provide the maximum distortion and minimum rate. In the levels in between, the quantization step sizes may provide an incremental tradeoff between distortion and rate.

The GR mapping component (620) performs Golomb-Rice mapping on the residual low-frequency transform coefficient and the quantized high-frequency transform coefficients. That is, the GR mapping component (620) maps negative integers to positive odd integers and non-negative integers to positive even integers in the residual low-frequency transform coefficient and the quantized high-frequency transform coefficients. The mapped residual low-frequency transform coefficient and the mapped quantized high-frequency transform coefficients are then provided as inputs to the entropy coding component (622).

The entropy coding component (622) performs entropy coding on the mapped transform coefficients according to the entropy coding parameter k. Any suitable entropy coding technique may be used. In some embodiment of the invention, Exp-Golomb (EG) run-length EG (k) coding as previously described herein is used. The entropy coded luminance coefficients are then output to form part of the compressed image data block.

The fixed-length coding component (624) encodes the index of the entropy coding parameter k, which is then output as part of a header for the compressed block. In general, fixed-length coding assigns same length codewords to each possible input. For example, if k has two possible values, the codewords may be 1 bit. If k has four possible values, the codewords may be two bits. The coded index is then output to form part of the header of the compressed image data block.

The chrominance compression subsystem (602) includes a normalization component (628), a 2D IWT component (630), a Q and k selection component (636), a DC prediction component (632), a quantization component (638), a combiner (634), a GR mapping component (640), an entropy coding component (642), and a fixed-length coding component (644). The normalization component (628) subtracts 128 from each pixel in a chrominance block Cr and a chrominance block Cb to center the pixel values around 0.

The 2D IWT component (630) performs a two dimensional integer wavelet transform on the chrominance blocks Cb and Cr to split the chrominance data into low frequency chrominance transform coefficients $C_L^i$ and multiple levels of high-frequency chrominance transform coefficients $C_H^i$ which may also be referred to as low-frequency and high-frequency chrominance components or approximate and detail data or DC coefficients and AC coefficients. Any suitable IWT technique may be used. Further, the IWT may use any suitable number of lifting steps. As was previously explained, the number of lifting steps used depends on the size of the block to be transformed and the desired level of compression.

In one or more embodiments of the invention, the 2D IWT component (630) implements a 5/3 IWT as previously described. In some such embodiments, a sufficient number of lifting steps is used to result in one low frequency chrominance transform coefficient to achieve maximum compression. In some embodiments of the invention, the 2D IWT component (630) implements an S IWT as previously described. In some such embodiments, a sufficient number of lifting steps is used to result in one low frequency chrominance transform coefficient to achieve maximum compression.

For simplicity of explanation, the output of the 2D IWT component (630) is assumed to be one low-frequency chrominance transform coefficient $C_L^i$ and multiple levels of high-frequency chrominance transform coefficients $C_H^i$. One of ordinary skill in the art will understand other embodiments of the invention in which multiple low-frequency chrominance transform coefficients are used. The low frequency chrominance transform coefficient $C_L^i$ is provided as an input to the combiner (634) and the high-frequency chrominance transform coefficients $C_H^i$ are provided as an input to the Q and k selection component (636).

The DC prediction component (632) spatially predicts the low-frequency transform coefficient of the chrominance block Y based on the low-frequency chrominance transform coefficients of previously compressed neighboring blocks in the same frame. In one or more embodiments of the invention, the neighboring blocks used are the top left, top, and left neighboring blocks, and the predicted low-frequency chrominance transform coefficient is computed as previously described. The predicted low-frequency chrominance transform coefficient is provided as a second input to the combiner (634).

The combiner (634) subtracts the predicted low-frequency transform coefficient from the computed low-frequency transform coefficient (from the 2D IWT component (630)) to determine the residual low-frequency transform coefficient. The residual low-frequency transform coefficient is provided as one input of the GR mapping component (640) and as one input of the Q and k selection component (636).

The Q and k selection component (636) coordinates the selection of the quantization parameter Q to be used to quantize the high-frequency transform coefficients $C_H^i$ and the parameter k for the entropy coding of the quantized high-frequency transform coefficient $C_H^i$ and the residual low-frequency transform coefficient $C_L^i$. More specifically, the Q and k selection component (636) interacts with the rate control component (604) in the selection of a suitable quantization parameter Q and entropy coding parameter k such that the desired compression rate is achieved. As is explained in more detail below in the description of the rate control component (604), the value of the quantization parameter Q is selected jointly with the value of the entropy coding parameter k to determine values that give the minimum total coded-length for the low and high-frequency coefficients. Further, the values of these parameters are selected jointly with the values of these parameters for the luminance blocks.

The Q and k selection component (636) provides the selected entropy coding parameter k to the entropy coding component (642) and an index identifying the selected k value to the fixed-length coding component (644). Note that if k may take on two values, the possible values of the index may be 0 and 1. The Q and k selection component (616) also provides the selected quantization parameter Q to the quantization component (638) along with the high-frequency transform coefficients $C_H^i$.

The quantization component (638) quantizes the high-frequency transform coefficients $C_H^i$ according to the quantization parameter Q. Any suitable quantization technique may be used. In one or more embodiments of the invention, the quantization component (638) performs midtread quantization as previously described. The quantized high-frequency transform coefficients are provided as an input to the GR mapping component (640).

The quantization parameter indicates which of multiple quantization levels supported by the quantization component (638) is to be used to quantize the high-frequency transform coefficients $C_H^i$. In one or more embodiments of the invention, twelve quantization levels are provided. Similar to the quantization component (618), each quantization level corresponds to a vector having a quantization step size for each level of the high frequency transform coefficients $C_H^i$. Note that these vectors may have fewer and different entries than those for the high frequency transform coefficients $Y_H^i$.

The GR mapping component (640) performs Golomb-Rice mapping on the residual low-frequency transform coefficient and the quantized high-frequency transform coefficients. That is, the GR mapping component (640) maps negative integers to positive odd integers and non-negative integers to positive even integers in the residual low-frequency transform coefficient and the quantized high-frequency transform coefficients. The mapped residual low-frequency transform coefficient and the mapped quantized high-frequency transform coefficients are then provided as inputs to the entropy coding component (642).

The entropy coding component (642) performs entropy coding on the mapped transform coefficients according to the entropy coding parameter k. Any suitable entropy coding technique may be used. In some embodiments of the invention, Exp-Golomb (EG) run-length coding EG (k) coding as previously described herein is used. The entropy coded chrominance coefficients are then output to form part of the compressed image data block.

The fixed-length coding component (644) encodes the index of the entropy coding parameter k, which is then output as part of a header for the compressed block. The coded index is then output to form part of the header of the compressed image data block.

The rate control component (604) selects the value of the quantization parameter Q to be used for quantization of the high-frequency transform coefficients $Y_H^i$ and $C_H^i$ of each image data block in a frame. The rate control component (604) also selects the value of the entropy coding parameter k to be used for entropy coding the luminance coefficients and the value of the entropy coding parameter k to be used for entropy coding the chrominance coefficients. In some embodiments of the invention, the value of the entropy coding parameter k is chosen from two values, 0 and 3. These values were selected based on extensive simulation using differing image types. In other embodiments of the invention, the number of values that the entropy coding parameter k may have may be different and may be chosen based on the requirements of the application and/or the types of images.

The rate control component (604) implements budget-constrained Rate-Distortion (RD) optimization in which the rate of compression for a frame is guaranteed not to exceed a threshold, i.e., rate constraint, $R_T$. This rate constraint may be user specified, e.g., via a user interface, or predetermined. Further, the rate constraint may be applied for any grouping of consecutive image data blocks in a frame, e.g., a line, multiple lines, a sub-frame, or the entire frame. Any suitable budget-constrained rate control technique may be used, such as, for example, the previously described budget-constrained rate control techniques. In some embodiments of the invention, the rate control component (604) implements a leaky-bucket like rate-control technique as previously described. The selected quantization parameter Q is provided to the Q and k selection components (616, 636) and the index of the selected quantization value is provided to the unary coding component (606).

The rate control component (604) jointly selects the value for Q, the value for the luminance entropy coding parameter, and the value of the chrominance entropy coding parameter based on the rate constraint. In one or more embodiments of the invention, to minimize distortion, the rate control component (604) chooses a value for Q and the values for the entropy coding parameters for the luminance and chrominance blocks that come closest to matching a rate-constrained length, i.e., a bit budget, for the image data block without exceeding that length. More specifically, the rate control component (604) computes a maximum compressed length, i.e., a bit budget, for an image data block based on the overall rate constraint $R_T$. The rate control component (604) then finds the smallest value of Q that, in combination with a value for the luminance entropy coding parameter and a value for the chrominance entropy coding parameter, yields a bit stream closest to the maximum length without exceeding it.

For example, the rate control component (604) may iterate through the quantization levels provided by the quantization components (618, 638), computing a length using each one in combination with each value of the luminance entropy coding parameter and the chrominance entropy coding parameter supported by the respective entropy coding components (622, 642) to determine the appropriate combination of parameter values. Note that the length calculations for each quantization level and for each value of the entropy coding parameters may be performed without actually performing the quantization and entropy coding. For example, for an EG(k) code, the prefix is M+1 bits and the suffix is M+2 bits where $$M = \left\lfloor \log_2\left(\frac{x}{2^k} + 1\right) \right\rfloor$$

Thus, the length of an EG(k) code word for any input x is 2M+k+1 bits.

The unary coding component (606) unary codes the index of the selected quantization value. Unary coding is previously described herein. The coded index is then output to form part of the header of the compressed image data block.

An image data decompression system, e.g., a decompression component (342) or a decompression component (418), reverses the compression performed by the image data compression system of FIG. 6. One of ordinary skill in the art will understand the functionality of components of embodiments of an image data decompression system based on information provided herein. Accordingly, an image data decompression system is not described in further detail.

Figure 7:
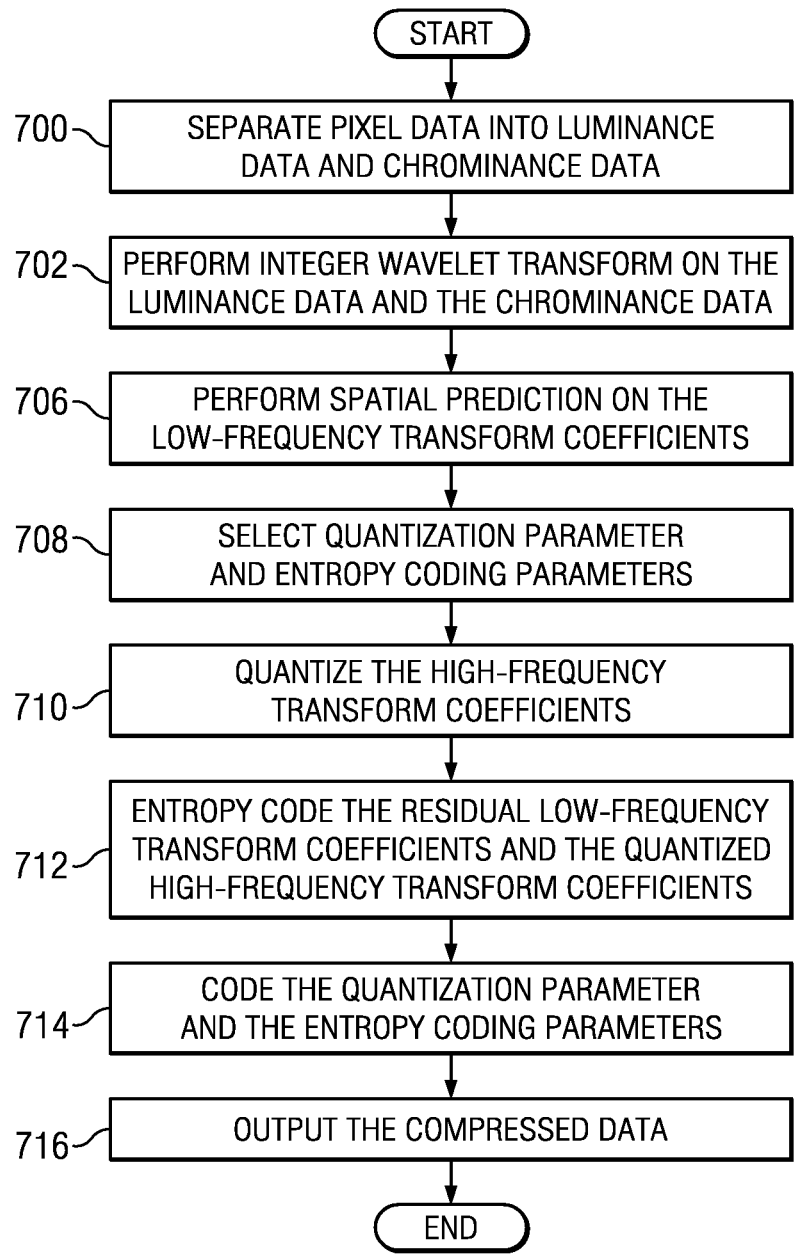
FIG. 7 shows a flow diagram of a method for image data compression in accordance with one or more embodiments of the invention.

FIG. 7 shows a flow diagram of a method for compression of a block of digital image data in accordance with one or more embodiments of the invention. The method is performed in raster scan order on blocks of image data in a frame to compress the frame. That is, a frame to be compressed is divided into rectangular tiles, i.e., image data blocks, of the same size. In some embodiments of the invention, the size of a block is chosen such that the width and height of the frame is evenly divided, and is a multiple of $2^{scales}$ where scales is the number of levels used in the IWT. In some embodiments of the invention, the size of a block does not evenly divide the frame. In such embodiments, blocks that do not contain a full complement of image data from a frame may be padded, for example, by using zeroes for the missing data, repeating the last pixel value, or mirroring. The image data may be any chroma sampling format, such as, for example 4:4:4, 4:2:2, or 4:2:0. If the incoming data is in RGB format, then a reversible component transformation (RCT) can be used for RGB to YCbCr conversion.

As shown in FIG. 7, initially the pixel data in the image data block is split into luminance data Y and chrominance data C (700). An integer wavelet transform is then performed on the luminance data Y and on the chrominance data C (702). The integer wavelet transform splits the luminance data into low-frequency luminance transform coefficients and high-frequency luminance transform coefficients. The integer wavelet transform also splits the chrominance data into low-frequency chrominance transform coefficients and high-frequency chrominance transform coefficients. Any suitable IWT technique may be used. As was previously explained, the number of lifting steps used depends on the size of the block to be transformed and the desired level of compression. In one or more embodiments of the invention, the integer wavelet transform is a 5/3 IWT as previously described. In some embodiments of the invention, the integer wavelet transform is an S IWT as previously described.

Spatial prediction is then performed on the low-frequency transform coefficients to generate residual low-frequency transform coefficients (706). More specifically, spatial prediction is performed on the low-frequency luminance transform coefficients to generate residual low-frequency luminance transform coefficients and on the low-frequency chrominance transform coefficients to generate residual low-frequency chrominance transform coefficients. The spatial prediction predicts the low-frequency transform coefficients based on the low-frequency transform coefficients of one or more previously compressed neighboring blocks in the same frame. In one or more embodiments of the invention, the neighboring blocks used are the top left, top, and left neighboring blocks, and the predicted low-frequency transform coefficients are computed as previously described. The residual low-frequency transform coefficients are then computed by subtracting the predicted low-frequency transform coefficients from the actual low-frequency transform coefficients.

A quantization parameter and entropy coding parameters are then selected (708). An entropy coding parameter is selected for the luminance transform coefficients and an entropy coding parameter is selected for the chrominance transform coefficients. The value of the quantization parameter may be selected jointly with the values of the entropy coding parameters to determine values that give the minimum total (low and high-frequency coefficients) coded length of all of the transform coefficients. Any suitable budget-constrained rate control technique may be used, such as, for example, the previously described budget-constrained rate control techniques. In some embodiments of the invention, a leaky-bucket like rate-control technique as previously described is used. The selection of the quantization parameters and the entropy coding parameters may be performed as previously described in reference to the rate control component (604).

The high-frequency transform coefficients are then quantized in accordance with the value of the selected quantization parameter (710). That is, the high-frequency luminance transform coefficients are quantized and the high-frequency chrominance transform coefficients are quantized. Any suitable quantization technique may be used. In one or more embodiments of the invention, midtread quantization as previously described is performed.

The residual low-frequency transform coefficients and the quantized high-frequency transform coefficients are then entropy coded according to the values of the selected entropy coding parameters (712). More specifically, the residual low-frequency luminance transform coefficients and the quantized high-frequency luminance transform coefficients are entropy coded based on the value of the entropy coding parameter selected for these coefficients. Similarly, the residual low-frequency chrominance transform coefficients and the quantized high-frequency chrominance transform coefficients are entropy coded based on the value of the entropy coding parameter selected for these coefficients. Any suitable entropy coding technique may be used.

In one or more embodiments of the invention, the residual low-frequency transform coefficients and the quantized high-frequency transform coefficients are coded using Exp-Golomb (EG) run-length coding as previously described. The EG code used is of the order of the value of the selected entropy coding parameter. Prior to the EG coding, Golomb-Rice (GR) mapping is performed on the residual low-frequency transform coefficients and the quantized high-frequency transform coefficients to map negative integers to positive odd integers and non-negative integers to positive even integers.

The selected quantization parameter and the selected entropy coding parameters are also coded (714). In one or more embodiments of the invention, an index identifying the selected quantization parameter is unary coded and indices identifying the selected entropy coding parameters are fixed length coded.

The compressed data of the image data block is then output (716). The compressed data for an image block includes a header and the compressed luminance and chrominance coefficients. The header includes the coded quantization parameter and the coded entropy coding parameters. The compressed data can be either a single bit-stream containing both luma and chroma information, or two separate bit streams for luma and chroma to enable asynchronous access.

A method for decompression of a block of digital image data may be used to reverse the compression performed by the compression method of FIG. 7. One of ordinary skill in the art will understand the functionality such a method for decompression based on information provided herein. Accordingly, a method for decompression is not described in further detail.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Figure 10:
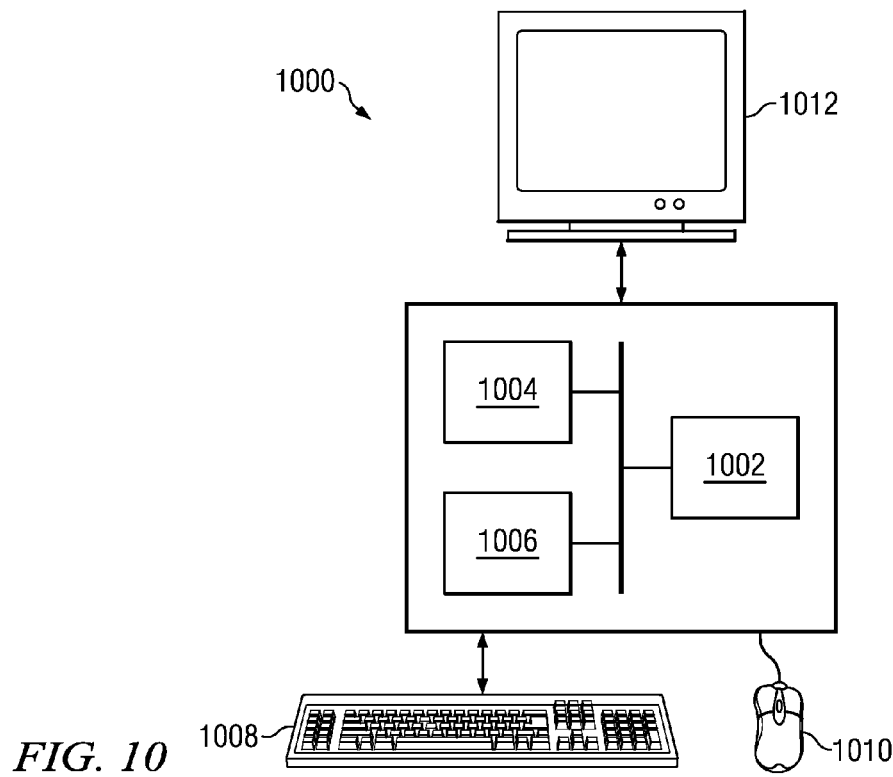
FIGS. 8-10 show illustrative digital systems in accordance with one or more embodiments of the invention.
Figure 8:
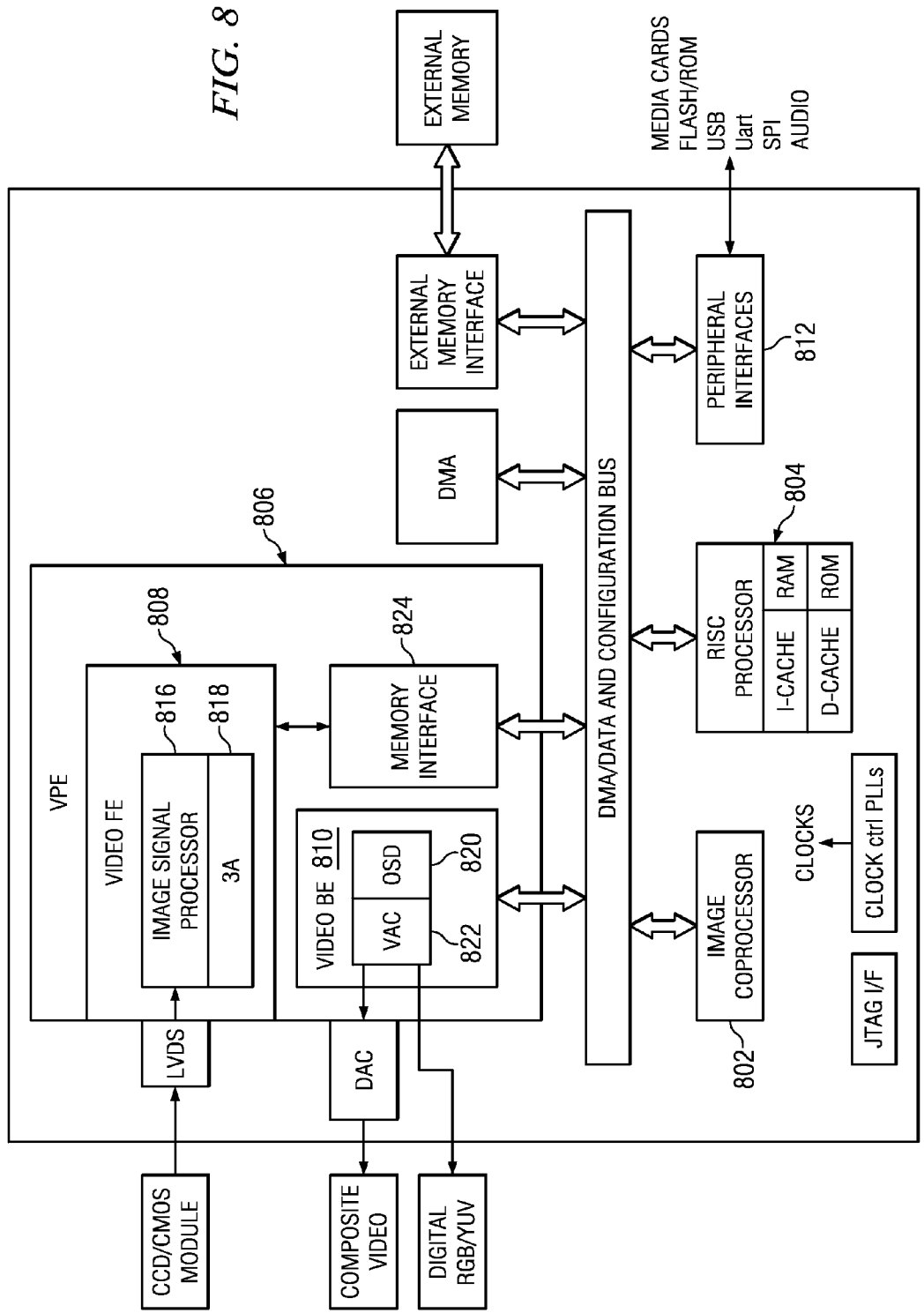
Figure 9:
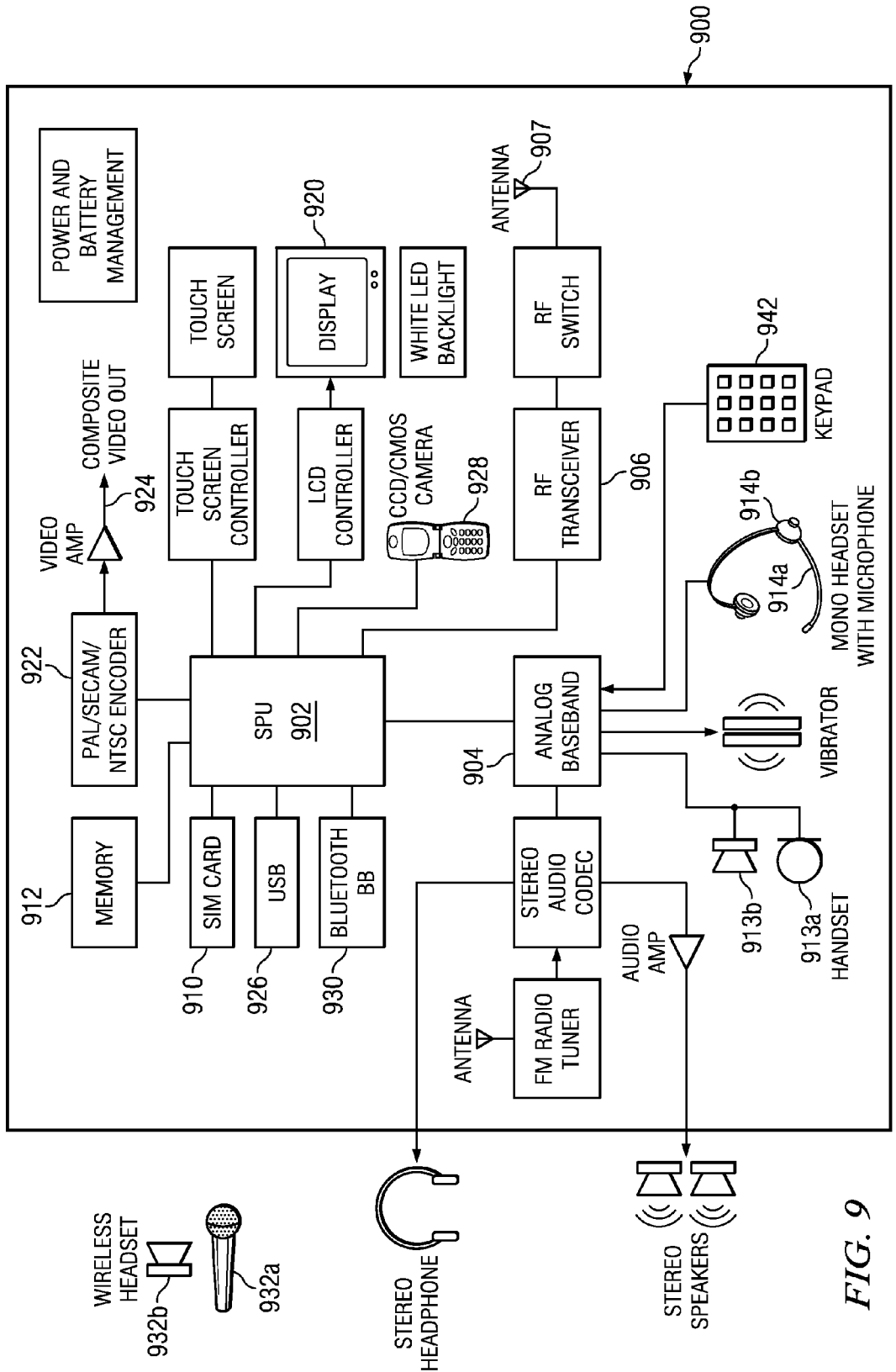

Embodiments of the methods and systems for digital image compression and decompression as described herein may be implemented for virtually any type of digital system (e.g., a desk top computer, a laptop computer, a handheld device such as a mobile (i.e., cellular) phone or MP3 player, a personal digital assistant, a digital video camera, a set top box, a digital video recorder (DVR), etc. with functionality to capture or otherwise generate digital image data and/or to receive and display digital image data. FIGS. 8-10 show block diagrams of illustrative digital systems.

FIG. 8 shows a digital system suitable for an embedded system (e.g., a digital camera) in accordance with one or more embodiments of the invention that includes, among other components, a DSP-based image coprocessor (ICP) (802), a RISC processor (804), and a video processing engine (VPE) (806) that may be configured to perform methods for digital image data compression and decompression described herein. The RISC processor (804) may be any suitably configured RISC processor. The VPE (806) includes a configurable video processing front-end (Video FE) (808) input interface used for video capture from imaging peripherals such as image sensors, video decoders, etc., a configurable video processing back-end (Video BE) (810) output interface used for display devices such as SDTV displays, digital LCD panels, HDTV video encoders, etc, and memory interface (824) shared by the Video FE (808) and the Video BE (810). The digital system also includes peripheral interfaces (812) for various peripherals that may include a multi-media card, an audio serial port, a Universal Serial Bus (USB) controller, a serial port interface, etc.

The Video FE (808) includes an image signal processor (ISP) (816), and a 3A statistic generator (3A) (818). The ISP (816) provides an interface to image sensors and digital video sources. More specifically, the ISP (816) may accept raw image/video data from a sensor (CMOS or CCD) and can accept YUV video data in numerous formats. The ISP (816) also includes a parameterized image processing module with functionality to generate image data in a color format (e.g., RGB) from raw CCD/CMOS data. The ISP (816) is customizable for each sensor type and supports video frame rates for preview displays of captured digital images and for video recording modes. The ISP (816) also includes, among other functionality, an image resizer, statistics collection functionality, and a boundary signal calculator. The 3A module (818) includes functionality to support control loops for auto focus, auto white balance, and auto exposure by collecting metrics on the raw image data from the ISP (816) or external memory.

The Video BE (810) includes an on-screen display engine (OSD) (820) and a video analog encoder (VAC) (822). The OSD engine (820) includes functionality to manage display data in various formats for several different types of hardware display windows and it also handles gathering and blending of video data and display/bitmap data into a single display window before providing the data to the VAC (822) in YCbCr format. The VAC (822) includes functionality to take the display frame from the OSD engine (820) and format it into the desired output format and output signals required to interface to display devices. The VAC (822) may interface to composite NTSC/PAL video devices, S-Video devices, digital LCD devices, high-definition video encoders, DVI/HDMI devices, etc.

The memory interface (824) functions as the primary source and sink to modules in the Video FE (808) and the Video BE (810) that are requesting and/or transferring data to/from external memory. The memory interface (824) includes read and write buffers and arbitration logic. In one or more embodiments of the invention, the Video FE (808) and the Video BE (810) are configured to perform compression of digital image data prior to transferring the data to external memory as described herein and to perform decompression of digital image data when transferring the data from external memory as described herein.

The ICP (802) includes functionality to perform the computational operations required for video encoding other processing of captured images. The video encoding standards supported may include one or more of the JPEG standards, the MPEG standards, and the H.26x standards. In one or more embodiments of the invention, the ICP (802) is configured to perform the computational operations of an embodiment of the compression and decompression methods described herein.

In operation, to capture an image or video sequence, video signals are received by the video FE (808) and converted to the input format needed to perform video encoding. The video data generated by the video FE (808) is stored in then stored in external memory. Prior to storing the video data in external memory, the video data is compressed as described herein. The video data is then encoded by a video encoder. During the encoding process, the video encoder reads the compressed input video data from the external memory and the computations for encoding this video data are performed by the ICP (802). The reference frames generated during video encoding are compressed as described herein and stored in the external memory. As the compressed reference frame data is read from the external memory, the reference frame data is decompressed as described herein. The encoded video data is stored in the external memory as it is generated. The encoded video data may then be read from the external memory, decoded, and post-processed by the video BE (810) to display the image/video sequence.

FIG. 9 is a block diagram of a digital system (e.g., a mobile cellular telephone) (900) that may be configured to perform compression and decompression as described herein. The signal processing unit (SPU) (902) includes a digital processing processor system (DSP) that includes embedded memory and security features. The analog baseband unit (904) receives a voice data stream from handset microphone (913a) and sends a voice data stream to the handset mono speaker (913b). The analog baseband unit (904) also receives a voice data stream from the microphone (914a) and sends a voice data stream to the mono headset (914b). The analog baseband unit (904) and the SPU (902) may be separate ICs. In many embodiments, the analog baseband unit (904) does not embed a programmable processor core, but performs processing based on configuration of audio paths, filters, gains, etc being setup by software running on the SPU (902). In some embodiments, the analog baseband processing is performed on the same processor and can send information to it for interaction with a user of the digital system (900) during a call processing or other processing.

The display (920) may also display pictures and encoded video streams received from the network, from a local camera (928), or from other sources such as the USB (926) or the memory (912). The SPU (902) may also send a video stream to the display (920) that is received from various sources such as the cellular network via the RF transceiver (906) or the camera (928). The SPU (902) may also send a video stream to an external video display unit via the encoder (922) over a composite output terminal (924). The encoder unit (922) may provide encoding according to PAL/SECAM/NTSC video standards.

The SPU (902) includes functionality to perform the computational operations required for video encoding and decoding. The video encoding standards supported may include, for example, one or more of the JPEG standards, the MPEG standards, the H.26x standards, and the emerging HEVC standard. In one or more embodiments of the invention, the SPU (902) is configured to perform the computational operations of compression and decompression of digital image data as described herein. Software instructions implementing all or part of the compression and decompression may be stored in the memory (912) and executed by the SPU (902) as part of capturing and/or encoding of digital image data, e.g., pictures and video streams and/or as part of decoding of digital image data for display.

FIG. 10 shows a digital system (1000) (e.g., a personal computer) that includes a processor (1002), associated memory (1004), a storage device (1006), and numerous other elements and functionalities typical of digital systems (not shown). In one or more embodiments of the invention, a digital system may include multiple processors and/or one or more of the processors may be digital signal processors. The digital system (1000) may also include input means, such as a keyboard (1008) and a mouse (1010) (or other cursor control device), and output means, such as a monitor (1012) (or other display device). Those skilled in the art will appreciate that the input and output means may take other forms. The digital system (1000) may also include an image capture device (not shown) that includes circuitry (e.g., optics, a sensor, readout electronics) for capturing video sequences. The digital system (1000) may include a video encoder with functionality to perform compression and decompression of digital image data as described herein.

The digital system (1000) may be connected to a network (not shown) (e.g., a local area network (LAN), a wide area network (WAN) such as the Internet, a cellular network, any other similar type of network and/or any combination thereof) via a network interface connection (not shown). The digital system (1500) may include functionality to receive encoded video sequences via the network interface connection, from the storage device (1506), and/or from removable storage media. The digital system (1500) may include a video decoder for decoding the encoded video sequences for display, the video decoder including functionality to perform compression and decompression of digital image data as described herein.

Further, those skilled in the art will appreciate that one or more elements of the aforementioned digital system (1000) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform computation operations of compression and decompression as described herein may be stored on a computer readable medium such as a compact disc (CD), a diskette, a tape, a file, memory, or any other computer readable storage device. The software instructions may be distributed to the digital system (1000) via removable computer readable media (e.g., floppy disk, optical disk, flash memory, USB key), via a transmission path from computer readable media on another digital system, etc.

While the invention has been described with respect to a limited number of embodiments, those skilled in the art, having benefit of this disclosure, will appreciate that other embodiments can be devised which do not depart from the scope of the invention as disclosed herein. For example, embodiments of the compression and decompression described herein may also be used in graphics systems. Accordingly, the scope of the invention should be limited only by the attached claims. It is therefore contemplated that the appended claims will cover any such modifications of the embodiments as fall within the true scope and spirit of the invention.

What is claimed is:

1. A method of compressing digital image data, the method comprising:
 a. for each image data block in a plurality of image data blocks in the digital image data,
  splitting the image data in the image data block into luminance data and chrominance data;
  transforming the luminance data using a two-dimensional integer wavelet transform to convert the luminance data to a low-frequency luminance coefficient and a plurality of high-frequency luminance coefficients;
  transforming the chrominance data using a two-dimensional integer wavelet transform to convert the chrominance data to a low-frequency chrominance coefficient and a plurality of high-frequency chrominance coefficients;
  computing a predicted low-frequency luminance coefficient for the luminance data based on at least one neighboring image data block in the plurality of image data blocks;
  computing a predicted low-frequency luminance coefficient for the chrominance data based on at least one neighboring image data block in the plurality of image data blocks;
  computing a residual luminance low-frequency coefficient based on the predicted luminance low-frequency coefficient and the low-frequency luminance coefficient;
  computing a residual chrominance low-frequency coefficient based on the predicted chrominance low-frequency coefficient and the low-frequency chrominance coefficient;
  selecting a quantization parameter, a luminance entropy coding parameter, and a chrominance entropy coding parameter using rate control, wherein the rate control guarantees a predetermined compression rate;
  quantizing the plurality of high-frequency luminance coefficients and the plurality of high-frequency chrominance coefficients based on the quantization parameter;
  entropy coding the residual low-frequency luminance coefficient and the quantized high-frequency luminance coefficients based on the luminance entropy coding parameter; and
  entropy coding the residual low-frequency chrominance coefficient and the quantized high-frequency chrominance coefficients based on the chrominance entropy coding parameter.

2. The method of claim 1, wherein the rate control allocates an extra initial bit-rate to an initial image data block and gradually reduces the extra initial bit-rate for subsequent image data blocks to guarantee the predetermined compression rate.

3. The method of claim 1, wherein
 transforming the luminance data comprises performing a sufficient number of lifting steps are performed to convert the luminance data into a single low-frequency luminance coefficient and the plurality of high-frequency luminance coefficients; and
 transforming the chrominance data comprises performing a sufficient number of lifting steps to convert the chrominance data into a single low-frequency chrominance coefficient and the plurality of high-frequency chrominance coefficients.

4. The method of claim 1, wherein computing a predicted low-frequency luminance coefficient comprises computing the predicted low-frequency luminance coefficient based on a left neighboring image data block, a top neighboring image data block, and a top-left neighboring image data block; and computing a predicted low-frequency chrominance coefficient comprises computing the predicted low-frequency chrominance coefficient based on a left neighboring image data block, a top neighboring image data block, and a top-left neighboring image data block.

5. The method of claim 1, further comprising coding the quantization parameter, the luminance entropy coding parameter, and the chrominance entropy coding parameter.

6. The method of claim 1, wherein the digital image data is a reference frame.

* * * * *